United States Patent
Cohen et al.

(10) Patent No.: US 11,935,543 B2
(45) Date of Patent: Mar. 19, 2024

(54) SYSTEM AND METHOD FOR COOPERATIVE PLAN-BASED UTTERANCE-GUIDED MULTIMODAL DIALOGUE

(71) Applicant: Openstream Inc., Somerset, NJ (US)

(72) Inventors: Philp R. Cohen, Deer Harbor, WA (US); Rajasekhar Tumuluri, Bridgewater, NJ (US)

(73) Assignee: Openstream Inc., Bridgewater, NJ (US)

( * ) Notice: Subject to any disclaimer, the term of this patent is extended or adjusted under 35 U.S.C. 154(b) by 85 days.

(21) Appl. No.: 17/341,804

(22) Filed: Jun. 8, 2021

(65) Prior Publication Data
US 2022/0392454 A1 Dec. 8, 2022

(51) Int. Cl.
| | |
|---|---|
| *G10L 17/10* | (2013.01) |
| *G10L 17/02* | (2013.01) |
| *G10L 17/22* | (2013.01) |
| *G10L 17/26* | (2013.01) |

(52) U.S. Cl.
CPC ............. *G10L 17/10* (2013.01); *G10L 17/02* (2013.01); *G10L 17/22* (2013.01); *G10L 17/26* (2013.01)

(58) Field of Classification Search
CPC ......... G10L 17/10; G10L 17/02; G10L 17/22; G10L 17/26
See application file for complete search history.

(56) References Cited

U.S. PATENT DOCUMENTS

| | | | |
|---|---|---|---|
| 7,257,575 B1* | 8/2007 | Johnston | G06F 40/289 707/999.102 |
| 11,132,504 B1* | 9/2021 | Mont-Reynaud | G06F 40/30 |
| 2006/0053000 A1* | 3/2006 | Moldovan | G06F 40/30 704/9 |
| 2013/0275164 A1* | 10/2013 | Gruber | G10L 17/22 705/5 |
| 2015/0332670 A1* | 11/2015 | Akbacak | G10L 15/18 704/9 |
| 2017/0293611 A1* | 10/2017 | Tu | G06F 16/48 |

(Continued)

OTHER PUBLICATIONS

Hung, Victor, et al. "Towards a method for evaluating naturalness in conversational dialog systems." 2009 IEEE international conference on systems, man and cybernetics. 2009, pp. 1236-1241. (Year: 2009).*

(Continued)

*Primary Examiner* — Jesse S Pullias
*Assistant Examiner* — Michael C. Lee
(74) *Attorney, Agent, or Firm* — Young Basile Hanlon & MacFarlane, P.C.

(57) ABSTRACT

Methods and systems for multimodal conversational dialogue. The multimodal conversational dialogue system includes multiple sensors to detect multimodal inputs from a user. The multimodal conversational dialogue system includes a multimodal sematic parser that performs semantic parsing and multimodal fusion of the multimodal inputs to determine a goal of the user. The multimodal conversational dialogue system includes a dialogue manager that generates a dialogue with the user in real-time. The dialogue includes system-generated utterances that are used to conduct a conversation between the user and the multimodal conversational dialogue system.

17 Claims, 10 Drawing Sheets

(56) References Cited

U.S. PATENT DOCUMENTS

| | | | |
|---|---|---|---|
| 2018/0330721 A1* | 11/2018 | Thomson | G10L 15/1822 |
| 2019/0096394 A1* | 3/2019 | Ramachandra Iyer | ...................... G10L 15/1815 |
| 2019/0371318 A1* | 12/2019 | Shukla | G10L 15/083 |
| 2020/0034719 A1* | 1/2020 | Zhang | G16H 10/60 |
| 2020/0242146 A1* | 7/2020 | Kalukin | G06F 16/3329 |
| 2021/0117479 A1* | 4/2021 | Liu | G06F 16/90332 |
| 2022/0179857 A1* | 6/2022 | Kompella | G06N 5/022 |

OTHER PUBLICATIONS

Dictionary.com definition of "sensor" and "sense organ", https://web.archive.org/web/20210302051001/https://www.dictionary.com/browse/sensor (available as of Mar. 2, 2021) (Year: 2021).*

Rao, Anand S., et al. "BDI agents: from theory to practice." Icmas. vol. 95. 1995, pp. 1-14. (Year: 1995).*

Cohen, Philip R. "Foundations of collaborative task-oriented dialogue: what's in a slot ?. " Proceedings of the 20th Annual SIGdial Meeting on Discourse and Dialogue. 2019. pp. 198-209 (Year: 2019).*

Definition of "Interpreter", available at https://web.archive.org/web/20210507015228/http://foldoc.org/interpreter (archived May 7, 2021) (Year: 2021).*

Cohen, P. R., and Levesque, H. J. "Intention Is Choice with Commitment" Artificial Intelligence 42, pp. 213-261 (1990).

\* cited by examiner

SYSTEM AND METHOD FOR COOPERATIVE PLAN-BASED UTTERANCE-GUIDED MULTIMODAL DIALOGUE

BACKGROUND

Current dialogue systems are frame-based or task-oriented systems. These systems have very limited goals in service of which the system performs actions such as book movie tickets, and make restaurant reservations. The system determines which action(s) in its repertoire the user is requesting, and prompts the user to provide values for the "slots" (i.e., parameters) in the desired action frame, where an action frame includes one or more parameters associated with the action. The one or more parameters may be associated with an intent. Natural Language Processing (NLP) techniques are useful for performing action/intent classification to determine which action is being requested, and slot-filling. Such systems prompt a user for missing slot values (e.g., the date & time, number of people, etc.) Users need to supply one or more atomic values to fill those slots, such as "Monday at 7 pm," where an atomic value is a value that is not defined in terms of something else, such as a function, predicate, or variable. The system learns optimal slot-filling dialogue policies from data, but only for simple atomic slot values. In typical systems, slots can only process atomic values and cannot process constraints.

Typical plan-based approaches to dialogue that were based on analyses of speech acts, synonymously dialogue acts, such as requesting, informing, confirming, suggesting, etc., had many technical limitations, especially the lack of a proper semantics and inference mechanism for the mental state expressions. Some prior approaches represented plans as a complex of mental state expressions, but only used belief and desire without offering any semantics to these terms, thus the expressions and inferences were not properly meaningful or constrained. Thus, the system's operation was not directly tied to the behavior specified by the formulae that it attributed to itself and to others. In other words, the formulae did not have operational semantics. Other prior works, such as current frame-based or task-oriented dialogue systems have no guiding formal semantics to their notions of intent and slot, so we do not know what their internal states mean. Furthermore, they have misused the terminology of intent to assume that the content of an utterance refers to an intended action, which it need not.

SUMMARY

In an aspect, a method for multimodal conversational dialogue may include obtaining one or more multimodal inputs from a user. The one or more multimodal inputs may be obtained via sensors. A portion of a multimodal input may include an utterance. The method may include performing semantic parsing and multimodal fusion of the one or more multimodal inputs to determine a goal of the user. The method may include generating a dialogue with the user. The dialogue may include one or more system-generated utterances. The method may include outputting the one or more system generated utterances.

In an aspect, a multimodal conversational dialogue system may include one or more sensors. The one or more sensors may be configured to obtain one or more multimodal inputs from a user. A portion of the multimodal input may include an utterance. The multimodal conversational dialogue may include a multimodal semantic parser. The multimodal semantic parser may be configured to perform semantic parsing and multimodal fusion of the one or more multimodal inputs to determine a goal of the user. The multimodal conversational dialogue system may include a dialogue manager. The dialogue manager may be configured to generate a dialogue with the user. The dialogue may include one or more system-generated utterances. The dialogue manager may be configured to output the one or more system generated utterances.

BRIEF DESCRIPTION OF DRAWINGS

The various embodiments of the disclosure will hereinafter be described in conjunction with the appended drawings, provided to illustrate, and not to limit, the disclosure, wherein like designations denote like elements, and in which.

DETAILED DESCRIPTION

In the disclosed embodiments, a plan-based dialogue system follows a different approach, called the belief-goal-intention (BGI) approach. This disclosed embodiments produce new implementation mechanisms and formalisms that guide the logic to engage in collaborative multimodal dialogues. The disclosed dialogue systems use beliefs, goals, persistent goals, and intentions. Goals have a lifecycle in which they are adopted, committed to (i.e., forming a persistent goal), planned, intended, attempted, achieved, abandoned, revised, retracted, or any combination thereof.

Figure 1:
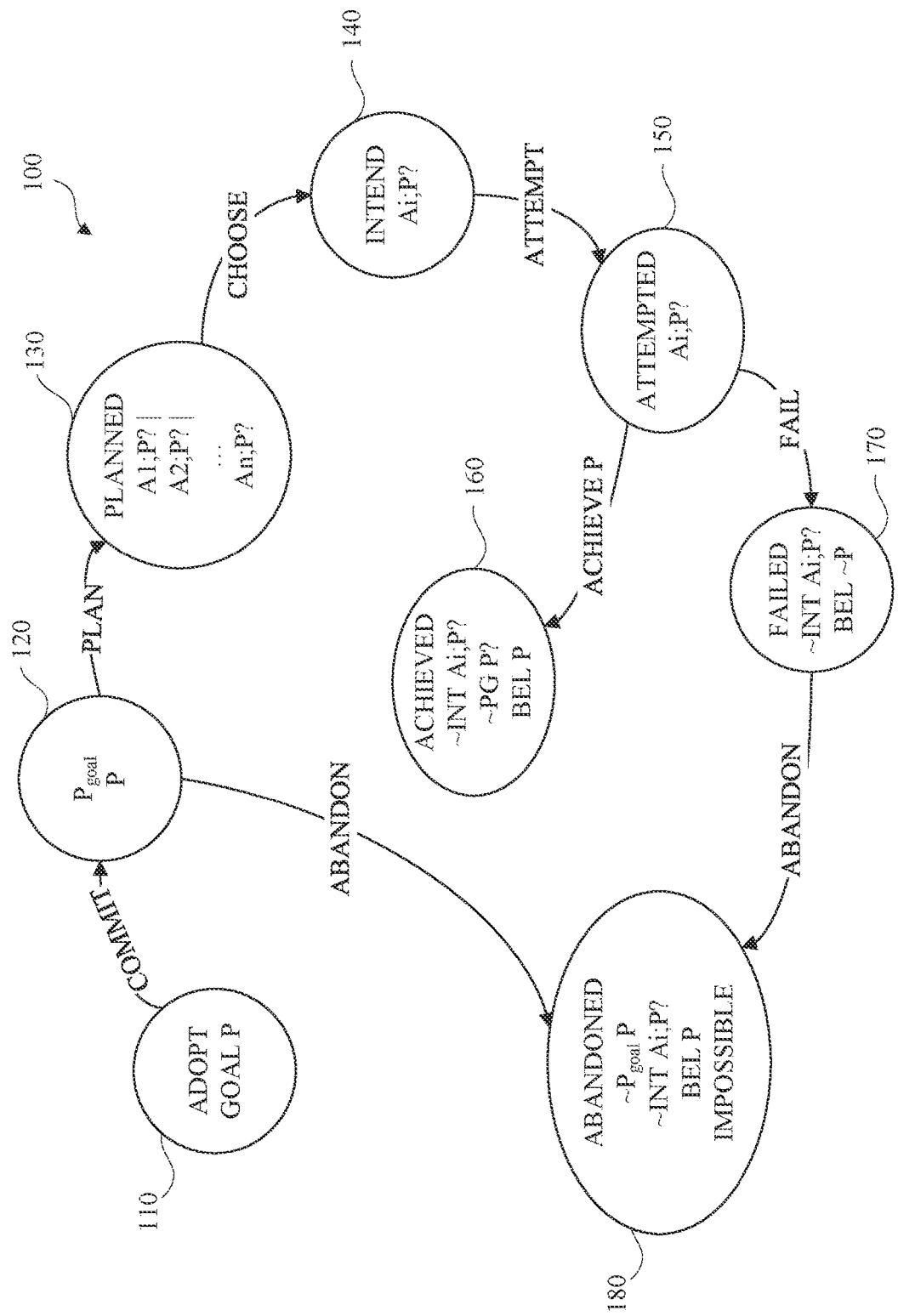
FIG. 1 is a flow diagram of an example of a goal lifecycle with a set of states in accordance with embodiments of this disclosure.

FIG. 1 shows the goal lifecycle 100 with a set of states. The goal life cycle 100 starts with the state adopt goal 110, shown as goal P. When a goal P is adopted, it becomes a persistent goal (pgoal) 120. The pgoal 120 may be an internal commitment that causes the system to plan to achieve the persistent goals. The system chooses among its planned 130 actions that achieve the chosen persistent goals, resulting in intended 140 actions. The system attempts to execute one or more intended actions that achieve the chosen persistent goal(s). The attempted actions 150 may be achieved 160 (i.e., success) or have failed 170. If the attempted actions 150 succeed, the intended action is marked (i.e., executed) and incorporated into a database of the system. The system also removes the intention to execute a marked action and the goal to achieve the effect from the database, and any pgoals that depend solely on them. In an example, the system knows that marked actions are successfully executed and hence no further execution of that action is required. Still, that action may be present in the database for future processing, if any. When an action is believed to be impossible (i.e., its applicability condition is false), the agent abandons 180 the intention and any pgoal to achieve the action, and retracts any beliefs and/or goals that depended solely on them, via a relativization parameter of the pgoal or intention. The relativization parameter may be associated with another agent's intention/behavior. For example, a relativized pgoal is an achievement goal, i.e., the system has the pgoal that it be done in the future based on its belief of possible success in the future. The relativization parameter may help in controlling the intended actions to perform the relativized pgoal. This relativization parameter may be useful to revise the agent intentions and accordingly the actions. Persistent goals and intentions are commitments to act relative to a given state of affairs. If the agent comes to believe that state of affairs is false, it can drop its persistent goal or intention. For ease of exposition, we will paraphrase in English the technical term pgoal with the word "want", but mere desires are much weaker than pgoals.

Existing dialogue systems only represent slots as parameters of an action, that are filled, unfilled, or dontcare. Dontcare refers to ' anything ' as a slot value, for example, accepting any value for the slot that is identified as 'dontcare'. That is, it has no preference and the user is yet to specify a valid goal for that slot. The disclosed dialogue system represents slots as quantified persistent goals, such as the day the user wants to eat at Vittorio's. For example, underlying the question "what day would you like me to reserve Vittorio," the system may have the pgoal formula:

$$\text{knowref(system, Day\^{}pgoal(User, }\exists\text{Time\^{}do(system,} \\ \text{reserve(system, user, vittorio, Day, Time))))} \quad \text{Formula (1)}$$

Formula (1) indicates that the system knows the referent of the day that the user wants to eat at Vittorio at some time. The variables in formulas described herein are indicated by their first letter in upper case. The symbol "A" is interpreted as "such that", and "∃" is interpreted as "there exists."

Because of the definition of the knowref expression, this formula quantifies into two levels of modal operators—belief (bel) and pgoal, namely it is defined as:

$$\exists\text{Day\^{}bel(system, pgoal(User, }\exists\text{Time\^{}do(system,} \\ \text{reserve(system, user, vittorio, Day, Time)))))} \quad \text{Formula (2)}$$

Formula (2) represents a notion that there is a Day of which the system thinks the user wants the system to reserve Vittorio for the user on that Day at some Time.

By having such a representation, the system can represent that different agents have different beliefs and pgoals about the fillers of slots. When Formula (1) becomes a system pgoal, it represents the notion that "the system wants to know the date that the user wants it to reserve Vittorio." When Formula (1) becomes a user pgoal, it represents the notion that the user wants the system to know the day that the user wants the system to reserve Vittorio for the user.

People often provide constraints instead of values. Current slot-filling dialogue systems will fail when given a response providing a constraint because those systems have been trained to accept only atomic values, and constraints can be arbitrarily complex. In the disclosed embodiment, the dialogue system supports the handling of constraints on slots. An example dialogue between a user and the system is shown, where a user utterance is U and a system utterance is S:

a) U: "Please book me a table at Vittorio for Friday"
b) S: "What time do you want to eat at Vittorio?"
c) U: "After 7 pm", or "not before 7 pm, or "between 7 and 8 pm", or "the earliest time available"

A WH-question, or WH-Q, is a question that begins with "who," "what," "where," "when," "which," "why," or any other question that begins with a word that starts with "wh," as well as "how." When a WH-question is asked (or any dialogue action is performed), the effect of the action is placed into a context. For example, after utterance b), the context contains:

$$\text{pgoal(user, knowref(system, Time\^{}pgoal(user,} \\ \exists\text{Day \^{}do(user,eat(user, vittorio, Day, Time)))),} \quad \text{Formula (3)}$$

which indicates that the user wants the system to know the time that the user wants to eat at Vittorio's on some day.

Every action has a constraint formula (CF). In the above utterance b), the eat action has a constraint formula.

New utterances may unify a new predicate with shared variables into the CF of the action in contextual formulas, which adds a conjunct to the CF and thereby restricts the values of the shared variables for which the CF is true. For example, if the user said "after 7 pm" in the example above, the meaning of that utterance would be the constraint (i.e., after Time 7 pm). When that constraint is unified into the CF from Formula (3), it results in:

$$\text{pgoal(user, knowref(system,Time\^{}(pgoal(user,} \\ \exists\text{Day\^{}do(user, eat(user, vittorio, Day, Time)) \&} \\ \text{(after Time 7 pm))))).} \quad \text{Formula (4)}$$

which indicates that the system knows the Time that the user wants to eat at Vittorio's after 7 pm.

Depending on what is said, the system may instead replace part of the constraint in a CF with the constraint from the present utterance. Accordingly, if the system said "Sorry, there are no tables then," the user could reply "how about 8 pm?" In this example, the system would replace 7 pm with 8 pm in the CF (i.e., Formula (4)), yielding:

$$\text{pgoal(user, knowref(system,Time\^{}(pgoal(user,} \\ \exists\text{Day\^{}do(user, eat(user, vittorio, Day, Time)) \&} \\ \text{(after Time 8 pm)))} \quad \text{Formula (5)}$$

which indicates that the user wants the system to know that the time that user wants to eat at Vittorio is after 8 pm.

The embodiments described herein are based on planning and plan recognition that use the following abductive rules, where planning is a backward chaining from one or more goals and plan recognition is a forward chaining from one or more actions. The embodiments may also decompose actions into constituent parts in the body of the action, which may be referred to as hierarchical planning. Decomposing actions into constituent parts may include suppressing relativization parameters, roles, and argument types. These decomposing actions are probabilistically weighted, with the probability of rule consequents being computed from the antecedents via Bayes' formula. The plan recognition rules are used by the system to recognize the Agent's plan. An agent may refer to a user or software component that mimics the user, whereas a system may refer to a Question and Answer System or a Dialogue system, for example.

TABLE 1

Planning Rules for Agent (backward chaining)

| Rule | Definition |
| --- | --- |
| Effect → Action | If Action's effect is a pgoal for Agent, Agent may add an intention to perform Action to the plan. |
| Action → Precond (where Precond is a precondition) | If the agent intends to do Action, then if Agent does not believe that Precond holds, assert that Agent has the pgoal to achieve Precond. |
| Action→ Body (hierarchical planning) | If Body is a way to perform Action, then if agent has a pgoal or intention to perform Action, then the agent has a pgoal or intention to perform Body into the plan. |
| Know-value | In order to perform an action with obligatory arguments, the agent needs to know what the parameters are, i.e., pgoal(Agent, knowref (Agent, Parameter^do (Agt, Act(Parameter)))) |
| Know-whether | If Agent wants to achieve P, Agent needs to know whether the formula P is true, i.e., assert pgoal(Agent, knowif(Agent, P)). |
| Reverse a negative state | If Agent is in a negative state, Agent wants to be in the corresponding positive one. Examples of negative state include being sick, hungry, tired vs. positive states of being well, sated, rested. |

TABLE 2

Plan Recognition Rules (forward chaining)

| Rule | Definition |
| --- | --- |
| Precond → Action | If Agent is believed to have formula Precond as a pgoal, and Precond is a precondition for Action, then assert the bel(system, pgoal(Agent, do(Agent, Action)) |
| Action → Effect | If the system believes Agent intends to do Action, assert that the system believes the agent has Effect as a pgoal; i.e., bel(system, pgoal(user, Effect)) |
| Body → Action (plan parsing) | If the agent intends to perform Body, and Body is part of Action, then infer the intend(Agent, Action). |
| KnowPos, KnowNeg | If the system believes the Agent wants to know whether P is true, i.e., bel(system, pgoal(Agent, knowif(Agent, P))), assert that the bel(system, OR(pgoal(Agent, P), pgoal(Agent, ~P)), which means that either the Agent may want P to be true or want it to be false. A specific case of this rule is know-whether-exists. |
| Know-whether-exists | If an agent wants to know whether ∃Xp(X) (there exists an X such that predicate p is true of X), then assert that the agent has the pgoal pgoal(Agent, knowref(Agent, X^p(X))) -- Agent may want to know which X it is. |
| Normal Activity | People want to go places to do the normal activities one does there. For example, people normally go to movie theaters in order to watch movies; people normally do not go to movie theaters in order to eat popcorn. |

In existing systems, techniques for natural-language based dialogue systems are provided. However, natural-language based task-oriented dialogue systems do not capture the rich semantics possessed by speech, visual, and language cues, nor are they responsive to users' plans or to their mental states (e.g., beliefs, persistent goals, intentions, obligations, or the like). In the embodiments disclosed herein, multimodal dialogue systems and methods are presented. A system may include a goal-oriented dialogue manager, that includes one or more tools such as a collaborative agent that engages in plan recognition, a cooperation tool that decides whether and how to act cooperatively by performing planning, a mental state reasoner, a meta-logic interpreter, a knowledge-based executor, and a generator for multimodal routines. The dialogue manager with one or more of the above tools and the logic provided to recognize the user's plan that led to the observed multimodal behavior, execute an agent's actions in that plan, or detect the obstacles in those plans, develop alternative plans to overcome those obstacles, based on one or more contextual multimodal elements, confirm whether the user wants the alternative plan to be executed, and if so, executes the alternative plan. The formal treatment of utterances and the mental states that result from the dialogue actions in the multimodal dialogue are based on representations of physical and digital actions, communicative actions such as dialogue actions that may occur in any single or combination of communicative modalitiesf, and mental and emotional states such as beliefs, persistent goals, intention and various emotions, such as anger, sadness, regret, or the like, for one or more dialogue participants.

The formal treatment of the mental states resulting from a sequence of multimodal dialogues may be based on physical action, speech actions, mental states such as beliefs, persistent goals, and intention, and emotional states such as mood, and empathy. The formal treatment guides the development of the dialogue system and enables the system to reason its way through a dialogue based on what the system believes the user was trying to do, and whether the system decides to cooperate. In some examples, the system may decide to not cooperate if the user was determined to be insincere, ironic, or joking.

A cooperative plan-based utterance guided multimodal dialogue handling system and method may be used to automatically infer and respond collaboratively to the user's goals, intentions, and plan, which include the observed actions. The system may be configured to receive parallel or sequential dialogue acts incorporating the meanings of utterances and other multimodal inputs, fuse those meanings semantically, infer the intended meaning of each fused dialogue act through discovering the user's goals, intentions, and plans, generate a cooperative plan, and by analyzing formally the multimodal constructs and cues in one or more dialogue actions and reasoning about the mental states of the user, generate a collaborative multimodal response. If the speaker is determined through multimodal classification and recognition to be an imposter, lying, or not serious (i.e., ironic, sarcastic, or joking), the system does not behave collaboratively, but may dynamically generate and challenge the user to answer questions that a known or serious user should know the answers to.

Multimodal utterances contain one or more elements of text, speech, audio, visual, body language and postures, gestures, facial expressions, eye gaze, lip reading, or the like. In reference to the above, a user query may have one or more modalities such as speech, text, images, scanned objects, touch, or the like. From a technical point of view, these inputs may be obtained from one or more sensors and can be seen as analogous to sensor data.

In one approach, semantic compatibility between different modality inputs may be used. In another approach, machine learning of correlations across modalities may be used. In another approach, natural language processing, computer vision and machine learning approaches may be used to discover the utterances and user goals, intentions, and plans, and the domain of query. In yet another approach, multimodal constructs may be used to fuse the multimodal data and establish the semantic domain, and user-specific relationships through a data structure such as a knowledge graph or database, and/or logical reasoning.

The cooperative plan-based dialogue system may be configured to perform various steps as is described herein. For the sake of explanation and understanding, reference is drawn towards a novel planner to reason about physical, digital, and communicative actions based on reasoning about physical, mental, and emotional states. The mental and emotional states of participants are derived by analyzing the multimodal signals and goals, intentions, and plans expressed by one or more dialogue actions.

The process includes performing multimodal data fusion covering natural language text, speech, image, video, touch, gesture, lip reading, or the like, to provide input to the dialogue system. Success of such a multimodal dialogue system mainly depends on the quality of the plan that has been recognized and/or confirmed, by the analysis of the multimodal inputs, and by the ability of the system to explain its actions.

The system may be configured to determine user emotion and mood by using one or more modalities including natural language, speech and vision technologies employed during one or more multimodal dialogues given as input to the system. User mood or sentiment may be directed at an action or event. For example, the system may believe that a user is angry that an action or event occurred. In particular, the user may be angry with the agent of the action (which could be the system) for having performed the action. The system could then infer that the user did not want the action performed.

Figure 2:
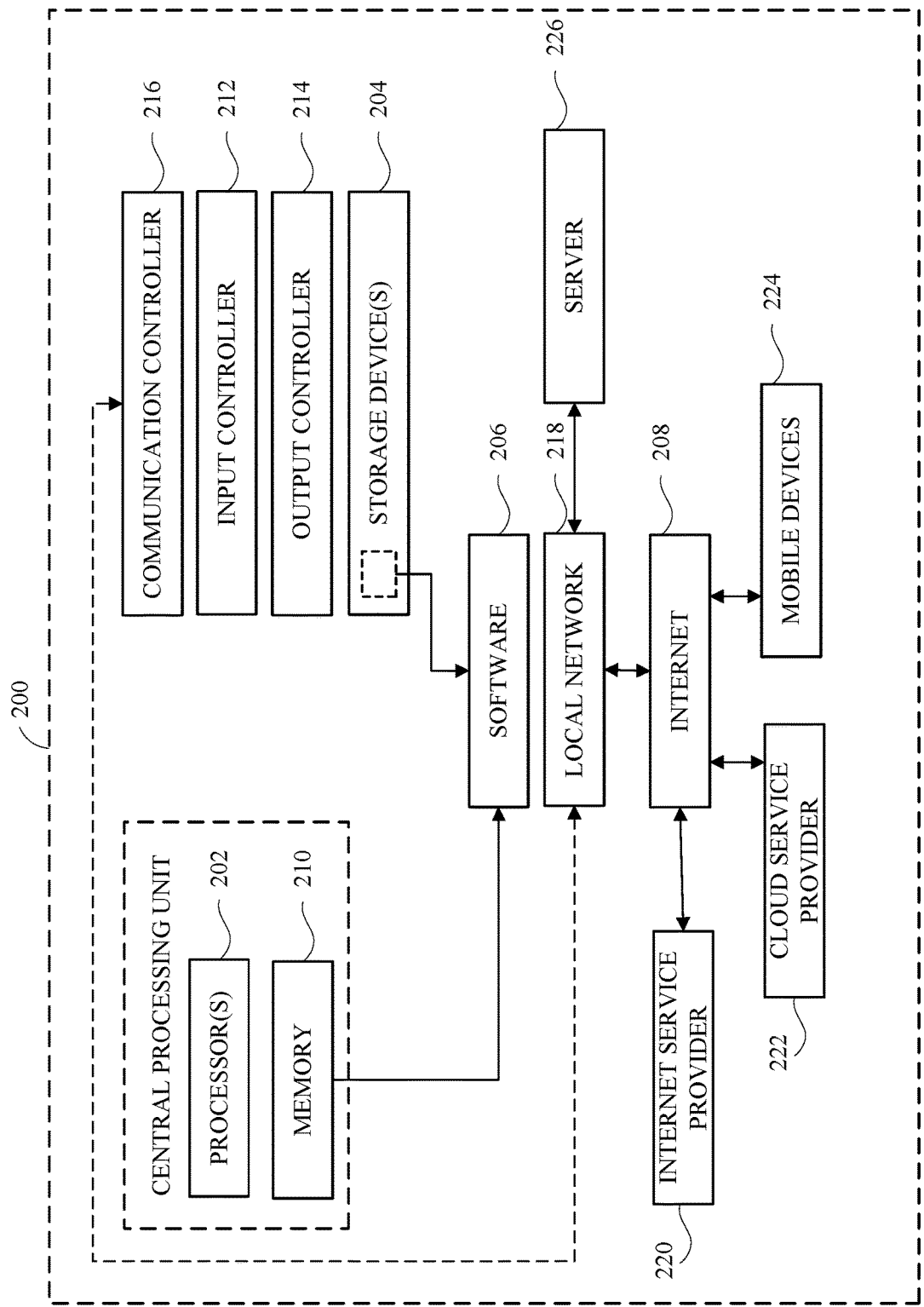
FIG. 2 is a block diagram of an example of a computing device in accordance with the embodiments of this disclosure.

FIG. 2 is a block diagram of a system that comprises a computing device 200 to which the present disclosure may be applied according to an embodiment of the present disclosure. The system includes at least one processor 202, designed to process instructions, for example computer readable instructions (i.e., code) stored on a storage device 204. By processing instructions, processor 202 may perform the steps and functions disclosed herein. Storage device 204 may be any type of storage device, for example, but not limited to an optical storage device, a magnetic storage device, a solid-state storage device, or a non-transitory storage device. The storage device 204 may contain software 206 which may include a set of instructions (i.e. code). Alternatively, instructions may be stored in one or more remote storage devices, for example storage devices accessed over a network or the internet 208. The computing device 200 also includes an operating system and microinstruction code. The various processes and functions described herein may either be part of the microinstruction code, part of the program, or a combination thereof, which is executed via the operating system. Computing device 200 additionally may have memory 210, an input controller 212, and an output controller 214 and communication controller 216. A bus (not shown) may operatively couple components of computing device 200, including processor 202, memory 210, storage device 204, input controller 212, output controller 214, and any other devices (e.g., network controllers, sound controllers, etc.). Output controller 214 may be operatively coupled (e.g., via a wired or wireless connection) to a display device such that output controller 214 is configured to transform the display on display device (e.g., in response to modules executed). Examples of a display device include, and are not limited to a monitor, television, mobile device screen, or touch-display. Input controller 212 may be operatively coupled via a wired or wireless connection to an input device such as a mouse, keyboard, touch pad, scanner, scroll-ball, or touch-display, for example. An input device (not shown) is configured to receive input from a user and transmit the received input to the computing device 200 vial the input controller 212. The input may be provided by the user through a multi-modal interface-based computer-implemented tool. These inputs are, but not limited to, images, speech, audio, text, facial expressions, body language, touch, scanned object, and video. The communication controller 216 is coupled to a bus (not shown) and provides a two-way coupling through a network link to the internet 208 that is connected to a local network 218 and operated by an internet service provider (ISP) 220 which provides data communication services to the internet 208. A network link may provide data communication through one or more networks to other data devices. For example, a network link may provide a connection through local network 218 to a host computer, to data equipment operated by the ISP 220. A cloud service provider 222 and mobile devices 224 provides data store and transfer services to other devices through internet 208. A server 226 may transmit a requested code for an application through internet 208, ISP 220, local network 218 and communication controller 216. FIG. 2 illustrates computing device 200 with all components as separate devices for ease of identification only. Each of the components shown in FIG. 2 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 200 may be implemented as one or more servers, for example a farm of networked servers, a clustered server environment, or a cloud network of computing devices.

Figure 3:
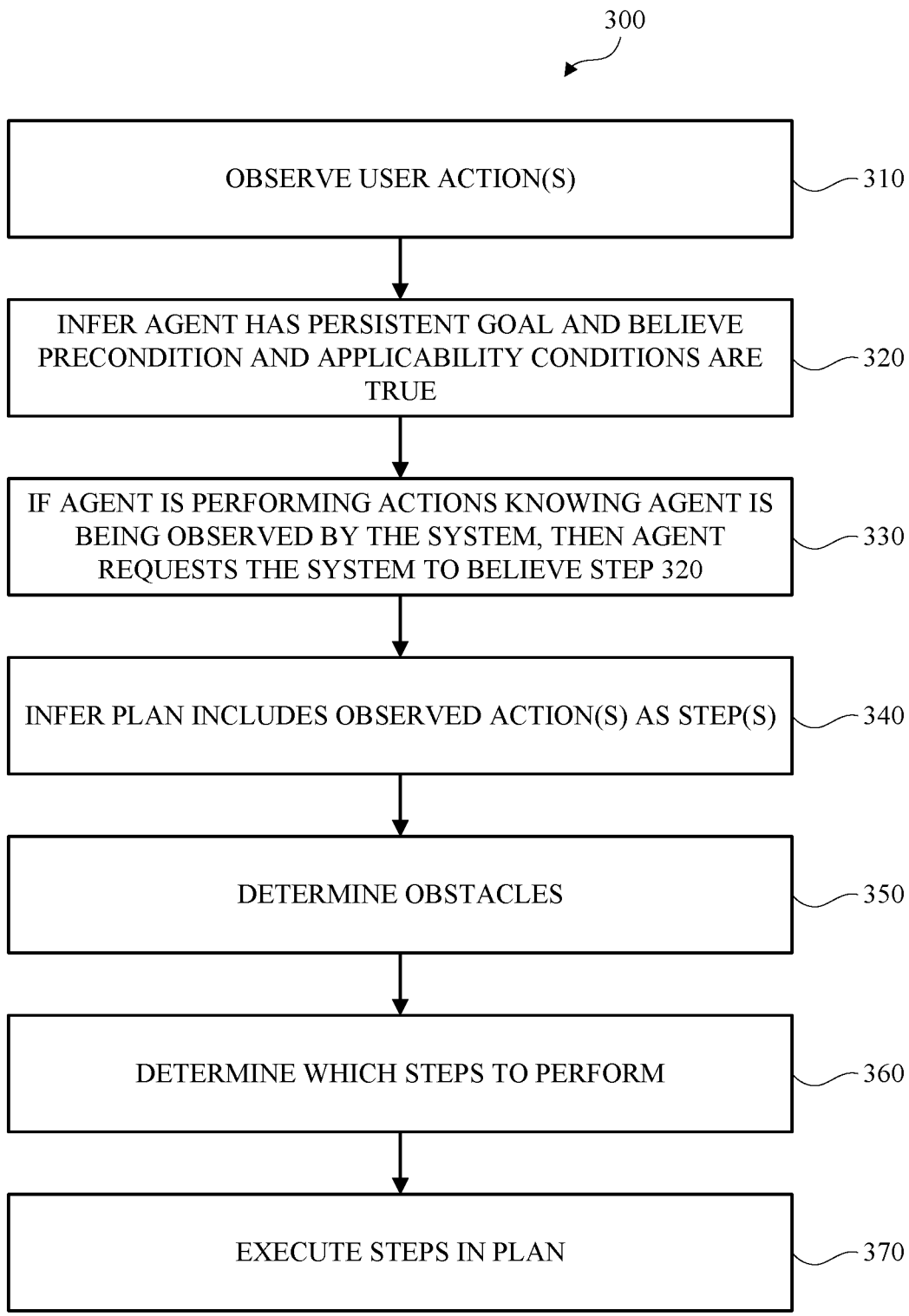
FIG. 3 is a flow diagram of an example of a method for use in a planning system in accordance with embodiments of this disclosure.

FIG. 3 is a flow diagram of an example of a method 300 for use in a planning system. The planning system may be a computing device, such as computing device 100 shown in FIG. 1. Based on a representation of communicative acts as operators in the planning system, the method 300 includes observing 310 one or more user actions. Observing 310 one or more user actions may include obtaining sensor data from one or more sensors. The method 300 includes inferring 320 that the agent has a persistent goal to achieve the effect and believe that the precondition and applicability conditions were true. If the agent is performing actions knowing that the agent is being observed by the system, then agent requests 330 the system to believe step 320. If the agent knows that it is not being observed by the system, then the agent goes into a failed state, and expects a revision of a pgoal with a different precondition and applicability conditions, or abandon if it is an impossible case. The method 300 includes inferring 340 the plan that the user is performing, which includes the one or more observed actions as a steps of the plan. The method 300 includes determining 350 if there are obstacles to the success of the plan that the user is performing. One such obstacle is the failure of applicability conditions to planned actions, which cannot be reversed by the user or the system, such as, for example, the unavailability of tickets or reservations to an event or flight. The method 300 includes determining 360 which steps the system will perform, including steps that would overcome obstacles. With the user's acceptance and permission, the method 300 includes executing 370 the steps in the plan that the user desires the system to perform, which may involve generating a multimodal response.

In some examples, steps 310-340 may be performed by a collaborative agent of the system for plan recognition, and steps 350-370 may be performed by a cooperation tool of the system for planning a cooperative response. The collaborative agent is configured to infer the user's plan behind his/her communicative acts, for instance, what were the acts the user intended to achieve. By the determining the plan above, this recognized plan involves complex mental and emotion states that incorporate the observed communicative actions, i.e., what did the user want/intend? For example, the plan may cause the system to infer that the user wanted the system to believe something or wanted the system to do something. In general, the system may infer that the user intended to perform the observed action in order to achieve its effect.

The cooperation tool is configured to adopt a user goal as a system goal, for example, if a system goal exists, the system goal may be overridden by the user goal as long as the system determines that the system goal may be overridden. In formulaic terms, this may be shown as bel(system pgoal(user, P))→pgoal(System, P). In other words, because a collaborative system wants the user to be successful, it takes on the satisfaction of the user's goal P, but may not itself plan to execute any actions to achieve P without user permission. The system may then identify obstacles in the inferred plan, which may include finding one or more actions whose applicability conditions are false (i.e., action is impossible), finding another action to achieve the effect of the inapplicable action (i.e., a new plan to overcome the obstacle), and executing the new plan.

Figure 4:
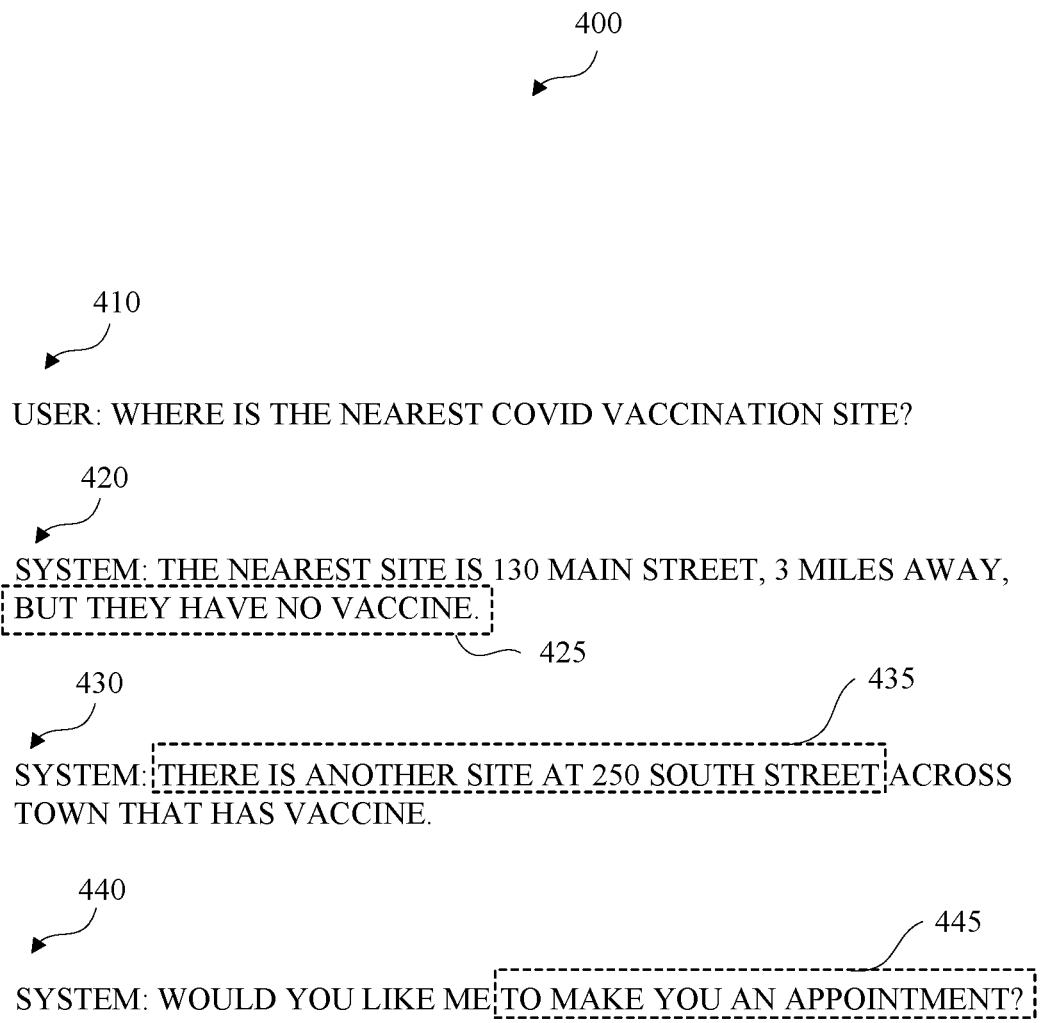
FIG. 4 is an illustration of an example of a collaborative dialogue in accordance with embodiments of this disclosure.

FIG. 4 is an illustration of an example of a collaborative dialogue 400 between a user and a system. The system may be a computing device, such as computing device 200 shown in FIG. 2. In this example, the collaborative dialogue 400 includes a user utterance 410, a first system utterance 420, a second user utterance 430, and a third system utterance 440. In this example, the collaborative dialogue 400 begins with the user utterance 410 "Where is the nearest covid vaccination site?" The system responds to user utterance 410 with the first system utterance 420 "The nearest site is 130 Main Street, 3 miles away, but they have no vaccine." A portion of the first system utterance 420 includes an obstacle detection 425 that indicates that an obstacle that may interfere with the user's plan is detected. The system determines an alternative plan 435 and responds with the second system utterance 430 "There is another site at 250 South Street across town that has vaccine. The system may then enable 445 the plan to succeed by responding with the third system utterance 440 "Would you like me to make you an appointment?" In this example, enabling the plan to succeed may include determining that the user would like to make an appointment.

Table 3 below shows an analysis of a sample dialogue conducted by the system disclosed herein. In this example, U represents a user and S represents the system. The system represents and reasons about the utterances and actions in its modal logic internal representation language.

TABLE 3

| No. | Speaker to Addressee | Utterance | Comment |
|-----|----------------------|-----------|---------|
| 1 | U to S | Are there any covid vaccination centers nearby? | This is an existential Yes/No question. It is not cooperative to just say "yes." The system infers User wants to know whether ∃(X)p(X) → User wants Knowref the-X, such that p(X) |
| 2 | S to U | Yes, CVS is a covid vaccination center located at 130 Main street, 6 miles away from you. | System over-answers the question because it believes User needs the information to execute his/her plan. Namely, the system infers that the user wants to know whether there is a nearby vaccine center because U wants to know where it is. System infers that user wants to know where it is because U wants to go to there in order to be vaccinated. |

TABLE 3-continued

| No. | Speaker to Addressee | Utterance | Comment |
| --- | --- | --- | --- |
| 3 | S to CVS | Do you have covid vaccine available? | An applicability condition for being vaccinated is the availability of vaccine.<br>S does not know if vaccine is available there, but believes that the CVS vaccine center does know whether it is available. So, it plans and executes a yes/no question to CVS about vaccine availability. This may involve email, text, telephonic or some other communication modality. However, the planning and understanding of communication actions is the same. |
| 4 | CVS to S | Yes. | S now comes to believe that the vaccine center has vaccine. |
| 5 | S to U | CVS has covid vaccine. | S believes U needs to know this fact in order to choose a vaccine center to administer vaccine |
| 6 | S to U | Now, I need to know whether you are eligible for a vaccination. | S believes eligibility is a precondition of being vaccinated. Preconditions are part of plan recognition rules, and are specified in the act definitions.<br>S says "now" when it begins to work on a new goal. |
| 7 | S to U | So, how old are you? | S needs to know U's age in order to determine eligibility. S says "So," when it is determining a sub-goal. S's definition of eligibility depends on U's age: S derives the logical form of the question from the underlying logic of eligibility. (Here, being over 65 years old => eligible, over 50 but under 65 => eligible if U is caring for a disabled person, under 50 => if U is an essential worker.) S does not simply issue pre-structured questions. It derives its questions from a logical representation of the English conditions of eligibility. If the conditions for eligibility change in the logic, the system will ask different questions. |
| 8 | U to S | 45 years old. | |
| 9 | S to U | So, now I need to know if you are an essential worker | S is working through its eligibility criteria. It again says "So," when its current goal is a sub-goal of a prior goal. |
| 10 | S to U | What is your occupation? | |
| 11 | U to S | I am a teacher. | |
| 12 | S to U | OK, You are eligible to receive a covid vaccine. | S confirms its prior stated goal. It says "OK" to convey that is has finished working on a prior goal or sub-goal. |
| 13 | S to U | Now, would you like me to make an appointment at a covid vaccination center? | S has an action that it can perform, but needs to know whether U wants it to perform that action. |
| 14 | U to S | Yes, please. | |
| 15 | S to U | What date and time would you like the appointment? | In order to make an appointment for U, S needs to know the values of the required arguments, namely date and time. This causes S to form the goals to KNOWREF the date and time such that U wants S to make an appointment at that date and time. This "slot-filling" is performed by reasoning about knowledge, using the formulas given previously. |
| 16 | U to S | Monday, the earliest time available. | U has not replied with an atomic value for the time, but with a constraint. |
| 17 | S to U | The earliest available time is 9 am. | S tells U what U needs to know, in order to know whether U wants the appointment at that time. S's goal expressed previously in utterance 15 to know the time that U wants has not yet been satisfied. |
| 18 | U to S | Fine. | U confirms that the proposed time is acceptable (i.e., U wants to have an appointment at that time). S's goal has now been satisfied. Notice that U has not "filled the slot", as presumed by existing task-oriented dialogue systems. U and S have collaboratively filled the slot with S informing a time and U confirming that time is acceptable (i.e., is desired). Other communicative actions could be used here. For example, the system could propose a time ("how about 9am"), with the user accepting or rejecting it. The critical factor here is that the user is conveying his/her pgoal regarding the time. |

TABLE 3-continued

| No. | Speaker to Addressee | Utterance | Comment |
|---|---|---|---|
| 19 | S to U | Making an appointment at CVS covid vaccination center on Monday at 9 am. | S has inferred that the vaccination center (VC) at which U wants the appointment (CVS) is the VC where U wants to be vaccinated, which is the VC where U wants to go, which is the VC that is 6 miles away and has covid vaccine. The system traces through its chain of equivalences to combine all the parts of this plan. |

One or more approaches to planning may represent plans as graph data structures that include actions, preconditions, and effects. In the disclosed embodiments, plans are complex logical structures whose elements are actions, formulas (i.e., propositions), and relations between actions and formulas, where the relations may achieve or enable other actions and formulas.

The formulas can be first-order logic formulas, or logical modality operators applied to formulas. For example, belief (bel), persistent goal (pgoal), and intend (<action>) are some of the modalities. These logical modalities can be iterated. For example:

bel(mary, bel(john, pgoal (mary, do(john, reserve (john, vittorios, Monday, 7 pm)))).    Formula (6)

Formula (6) is an expression to show that Mary believes that John thinks that Mary wants John to reserve Vittorio's for Monday at 7 pm.

Having different logical operators applied to the elements of the plan mean that the user and system could differ on what the plan is. In an embodiment, the system could be speaking with multiple people, separately or together, and may keep track of their differing mental states including beliefs, goals, intentions, plans, or the like.

In one embodiment, the dialogue system is configured to determine, based on the plan, mental and emotional state representations of a user as logical sentences. This enables the system to address different attitudes towards, for example, the actions in the plan. For example, for a given action A, such as making a reservation for the user, the system may distinguish who wants A to be performed versus who is the agent of A. For example, the system could want the user to make the reservation, and the user could want the system to make the reservation. The data structure (e.g., graph) version of the plan without modalities such as "goal" or "intend" that incorporate the agent of the attitude as an argument, may not distinguish the different agents.

The formalism in an exemplary method may assume a first-order logical form, including (a) all elements of first-order logic, including usual connectives, functions, existential and universal quantifiers, typed variables, with types drawn from a taxonomy, where the functions include role functions, such as "agent," "patient," "patron," "date," "time," or the like; (b) actions including domain actions and communicative actions such as speech; and (c) modal operators such as belief, goal, and obligated, and defined operators such as persistent goal and intend.

The formalism in another exemplary method may assume sequence and temporal logical forms for identifying a change in the user's emotion, intent, or the like, by analyzing the multimodal elements such as image, video, speech, facial expression, gesture, eye gaze, lip reading, or the like, in conjunction with the dialogue sequence.

Actions can be either simple actions or compound actions:
a) Simple Actions can be represented as <name>([list of Arguments]), with the arguments being of the form:
   <role>:<filler>#<type>, where
   <role> and <type> are atoms, <filler> is an atom or a <Variable>
   Predicates: do<Action>, done<Action>
   Two special pre-actions for communication: Now, So
b) Compound Actions include:

| Compound Actions | Action symbol | Example |
|---|---|---|
| Sequential actions | A;B | |
| Predicates turned into an action | p? | Eligible(X)? |
| Conditional Actions | p?;A | Eligible(X)?;Make_Appt(X,vaccination) |
| Non-deterministic Or | A\|B | Inform(S,U,P)\| Inform(S,U,~P) |
| Concurrent Actions | A\|\| B | <speak>\|\|<gesture> |
| Pre; Communicative Act | So; A | "So, how old are you?" |
| Pre; Communicative Act | Now;A | "Now, are you an essential worker?" |

Actions may have preconditions, constraints, applicability conditions, effects, or any combination thereof, and may be expressed as formulas. In the above conditional actions, the constraint field of an action holds the conditions and shares variables with the enclosing action, such that when the constraint is evaluated, it provides values to the other conditions and the action itself.

Mental and emotional states of the user may be represented in the form of modal logic. Modal logic elements may include belief, goal, and intention, and emotional states such as, anger, sadness, and regret. The collection of axioms and inference rules express what the system should do. Propositions include first-order base language, with predicates, functions, roles, quantifiers, negation, typed variables, and modal operators. Modal operators may take a probability argument, which is suppressed herein. An operator may be defined with respect to arguments on which it can be operated. For instance, a unary operator takes one argument, a binary operator takes two arguments (e.g., a+b, here a and b are arguments and plus is an operator). The modal operators are described below:

Beliefs, Goals and Intentions
a. bel(X,P)—X believes that P, where P is a proposition
b. goal (X, P)—agent X has P as a goal
c. pgoal(X, P Q)—agent X has a persistent goal that P relative to Q
d. intend(X, A, Q)—agent X intends to do action A $=_{def}$ pgoal (X, done(X, A) Q), where $_{def}$ indicates a definition, for example, defining the logic specification.

Knowref:
Agent X knows the referent of the description X^p(X) (^ represents such that) is represented as:

knowref(X, Var#Type, P)≡∃Var#Type bel(X, P), such that variable Var is free in formula P. Being "free" means the variable is not associated to a quantifier, such as ∃ (exists). In the sequel, the Type of the variable is omitted.

"Quantifying—in", for example below is the representation of John knows Mary's phone number.
 a. John knows Mary's phone number—knowref(john, Ph^phone_number(mary, Ph)), which is defined as a "quantified-in" expression ∃ (Ph) bel(john, phone_number(mary,Ph))
 b. Note that John knows Mary's phone number implies, but is not implied by, John believes Mary has a phone number Quantifying into other modal operators: This formalism allows the system to quantify into other mental and emotion state operators:
 a. ∃Day^pgoal(john,do(john,reserve(john,vittorio,Day)))—meaning there is a day such that john has a pgoal to reserve Vittorio's restaurant on that day
 b. knowref(mary, Day^pgoal(john,do(john,reserve(john, vittorio,Day))))—meaning Mary knows the day that john wants to reserve Vittorio's
 c. pgoal(mary,knowref(mary, Day^pgoal(john, do(john, reserve(john,vittorio,Day))))
 meaning Mary wants to know the day that John wants to reserve Vittorio's Knowledge rules may be used to generate knowRef. In order to execute an action, the agent adopts a persistent goal to know the value (knowref) of the obligatory arguments to that action. Arguments in propositions and actions can be required. If an agent intends to perform an action, the agent must Knowref the value of the required arguments.

Example:
Agent Agt intends to perform action (ignoring the argument types from now on) reserve(Agt, Restaurant, Date, Time, Number)
Agent adopts the persistent goal to knowref the Restaurant (and ignoring the other existential quantifiers):
 pgoal(Agt. knowref(Agt, Restaurant^do(Agt,reserve(Agt, Restaurant, Date, Time, Number))))

The system is configured to generate a plan to achieve this goal, which is the effect of asking a WH-question. In other words, the system is engaged in slot-filling by reasoning about what it wants to know. However, unlike typical dialogue systems, the system plans to ask someone whom it thinks knows the answer. For example, in the sample dialogue shown in Table 3 above, the system plans question (7) to the user to find out the user's age because it believes the user knows (i.e., Knowref) his/her age.

Knowing Whether:
knowif(X,P)≡bel(X,P) V bel(X, ~P)
 John knows whether or not it is raining≠"John knows that it is raining or not (tautology). In order to (attempt to) perform an action, the agent must believe the Precondition, Constraint, and Applicability Condition are true.
 If the agent does not believe a condition is true or believe it is false, the agent adopts the persistent goal to KNOWIF(<condition>).

In the sample dialogue, the system plans question (3) to the CVS vaccine center about whether it has vaccine (3), because again it believes the vaccine center knows whether it has vaccine. It does not address that question to the user because it does not believe the user knows the answer. An example rule may be that if an agent wants to Knowif a formula is true, it must Knowref the required arguments of predicates in the formula. For example, to evaluate the formula that the user's age must be greater than 64, the system needs to know the user's age.

pgoal(system, knowif(system,age(user,Age) & greater_than(Age,64)))

the system must know the value of Age, so it generates the pgoal:

pgoal(system, knowref(system, Age^age(User,Age)))

This goal leads to question (7) in the sample dialogue shown in Table 3 above.
Goals/Intentions:
pgoal (Persistent Goal, i.e., internal commitment)–pgoal (X,P,Q)
 Agent X has a goal to achieve P relative to Q=def (meaning, 'is defined to be')
 Agent X has the Goal that eventually(P),
 and will keep that Goal P over time at least until:
 X believes P or X believes P is impossible
 X believes ~Q
 Persistent goals are achievement goals, the agent is committed to the goal P becoming true in the future. Formula Q is called the relativization condition and records the dependencies of commitments on external conditions.
Intend(Agt, Act,Q)=def pgoal(X, Eventually(done(Agt, Act)), Q)

In this example, an Intention is a persistent goal by an agent Agt to eventually have performed action Act. Pgoals lead to intentions to perform action. One or more mental state propositions may be adopted relative to others and stored as a list of supporting mental states in a memory, such as memory 210 shown in FIG. 2. If a mental state proposition is retracted, then mental state propositions that depend only on the retracted mental state proposition may be retracted.

The system may be configured to perform meta-logical operations. For example, the formulas may be proved, or asserted, using two meta-interpreters,
 Proving: ←. In order to prove the left-side of the arrow, prove the right side
 Asserting: →. In order to assert the left side, assert the right side.

The above ensures that the least embedded formula possible, subject to the logical semantics, is entered into the database. For example, the consider the sample Axiom Schema below:
 knowref(X, Var^Pred(Var))←bel(X, Pred(Var)), and Var is bound to an atomic symbol. This formula indicates that if the system is trying to prove that an agent X knows the referent of the description Var^Pred, then it suffices to show the agent believes Pred is true with Var bound to a constant/atomic symbol.

The system may be configured to combine mental states of the user to obtain compressed formulas as shown in the examples below.
 Proving: if trying to prove the left side, prove the right side.←
 bel(X, bel(X,P))←bel(X, P)
 bel(X, P&Q)←bel(X,P), bel(X,Q)
 pgoal(x, pgoal(X, P, Q), Q)←pgoal(X, P, Q)
 bel(X, pgoal(X,P))←pgoal(X,P)
 Asserting: if asserting the left side, instead assert the right side→
 bel(X, bel(X,P))→bel(X, P)
 bel(X, P&Q)→bel(X,P) and bel(X,Q)
 bel(X, knowref(X, Var^Pred))→knowref(X, Var^Pred)

knowref(X, Var^(bel(X, P(Var))))→knowref(X, Var^P(Var))

knowref(X, Var^Pred)) and Var is a constant→bel(X, Pred)

pgoal(X, pgoal(X, P, Q), Q)→pgoal(X, P, Q)

pgoal(X, intend(X, A), Q)→intend(X, A, Q). Where A is a (potentially complex) action pgoal(X, knowref(X, Var^Pred), Q), Var is a constant,→Pred is true bel(X, pgoal(X,P))→pgoal(X,P)

As the system is planning, the system is configured to construct equivalence classes of descriptions. For example:

An equivalence class of Dates:

The Date such that system intends to make an appointment for User at a covid vaccination center for that Date Equals The Date such that User intends to be vaccinated for covid at a covid vaccination center on that Date The system is configured to use these equalities to show that knowref(X, Var^Pred)←knowref(Var^Pred1) equals (Var^Pred, Var^Pred1), with Pred not the same as Pred1. In other words, to show that the system knows the referent of Var^Pred, it suffices to find an equality between Var^Pred and Var^Pred1, such that the system knows the referent of Var^Pred1. The system traces through its equalities to find a constant.

Note that anaphoric/pronominal references may be stated and resolved through these equalities.

Thus,

A: "Where do you want to eat tonight?"

B: " Let's eat at the restaurant Mary ate at last week that she liked so much."

A: "What did she like about it?"

"It" will be made equal to

Restaurant^(done(eat(mary, Restaurant, Day, Time)) & last_week(Day), liked(mary, Restaurant))

which is equal to:

Restaurant^pgoal(A, done(eat(A,Restaurant, today,Time) & tonight(Day,Time)), Q)

The system may be configured to resolve anaphoric/pronominal references by creating and resolving equivalences among variables quantified into modal operators, such as a formal representation of: ("^" interpreted as "such that", and "persistent goals" are paraphrased here as "want", though in the formalism, pgoals are much stronger than mere desires as they embody the concept of being committed to achieving the object of the pgoal).

Figure 5:
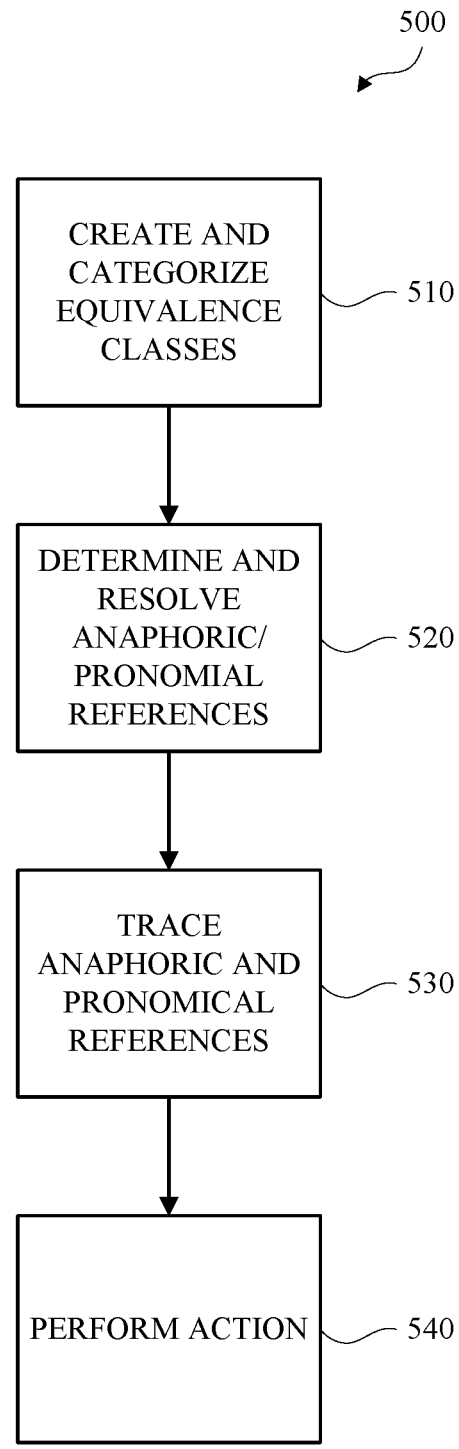
FIG. 5 is a flow diagram of an example method for resolving anaphoric and pronominal references in accordance with embodiments of this disclosure.

FIG. 5 is a flow diagram of an example method 500 for resolving anaphoric and pronominal references in accordance with embodiments of this disclosure. During planning and plan recognition, these descriptions are created 510 and categorized into equivalence classes. The method 500 includes determining 520 and resolving anaphoric and pronominal references. The resolution of anaphoric and pronominal references may include tracing 530 through the equivalences in a given class. Tracing may be defined as evaluating all the equality inferences. For example, an equivalence class may include a series of references to be inferred for a description, which may be performed during planning. Tracing may involve evaluating all those references. If an action is to be performed 540, eventually the equivalence results in a constant. Otherwise, the agent will attempt to know what the referent is, which results in the goal leading to a question.

Existing systems incorporate dialogue acts but do not reason about them other than to correlate them with the occurrence of other dialogue acts. The disclosed system plans dialogue acts to achieve various effects. In order to do so, one or more actions are modeled as having Preconditions, Effects, Constraints, and Applicability Conditions. For example, below are definitions of the speech acts of asking a Yes-No question (YNQ) whether P holds, and asking a Wh-question about the referent of description D. Also shown is a definition of the Request speech act that the system can use. In these examples, schematic variables are upper-cased, with P being a proposition and D being a description. It is assumed for the discussion below that the system is the Listener, and the Act is to be performed by the Speaker.

ynq(Speaker, Listener, P):
precondition: knowif(Listener, P)
effect: knowif(Speaker, P)
constraint: Speaker≠Listener
appl.cond: ∃C^channel(Speaker, Listener, C)

whq(Speaker, Listener, D):
precondition: knowref(Listener, D)
effect: knowref(Speaker, D)
constraint: Speaker≠Listener
appl.cond: ∃C^channel(Speaker, Listener, C)

request(Speaker, Listener, Act):
precondition: precondition(Act)
effect: intend(Listener, Act,
   pgoal(Speaker,
      do(Listener,Act)))
constraint: Speaker≠Listener
appl.cond: ∃C^channel(Speaker, Listener, C)

test_ynq(Speaker, Listener,P):
precondition: knowif(Listener, P)
effect: bel(S, bel(Listener,P)) V
   bel(S, bel(Listener, ~P))
constraint: Speaker≠Listener
appl.cond: ∃C^channel(Speaker, Listener, C)

test_whq (Speaker, Listener, D):
precondition: knowref(Listener,D)
effect: bel(S, ∃X bel(Agent, X=D))
constraint: Speaker≠Listener
appl.cond: ∃C^channel(Speaker, Listener, C)

For the yes/no question, the precondition that will be evaluated by the speaker during planning is that the listener knows whether P holds—either the listener believes P or the listener believes ~P, where ~P is a negation of P. Note that this disjunctive belief requires a system to represent that the agent knows whether P holds without knowing which state the agent is in. If the system knew which, it would not need to ask. Likewise, the wh-question includes the logic of the speaker that the listener knows the referent of D, such as the listener knows his/her occupation, without the speaker knowing what that value is. Again, the speaker may represent that the Listener knows the referent without representing what that value is. For a request to perform an Act, the precondition of the request is the precondition of the requested Act, effectively stating that the Act can be performed. The effect is that the Listener forms the intention to perform the Act relative to the speaker having a persistent goal that the Listener perform the Act. This is different from a recommendation, suggestion, or advising to action A, in which the speaker attempts to get the Listener to form the intention to perform action A because doing so would be good for the Listener, and not necessarily for the speaker. The constraint for these speech acts may state that the Speaker is not the same as the Listener, and the applicability condition says that there exists a communication channel to which both Speaker and Listener can attend. If there is no communication channel, then a different plan to influence the other should be determined, for example, by asking someone else to convey a message. The system is therefore able to plan third-party speech acts, in which the system asks a third party to either: perform a speech act to that third party, or asks a third party to convey the speaker's message. In the former case, the third party would be taken by the ultimate Listener to have the conveyed mental states. In the case of passing a message, or saying "John asked me to ask you to perform action X," the third party is conveying that s/he/it does not necessarily have the mental states normally ascribed to a speaker as given by the speech act definitions above.

Finally, above are definitions of test questions that the system can plan, Test_YNQ and Test_WHQ to handle the kinds of questions often found in classrooms. These are questions in which the speaker already knows the answer and wants to know what the Listener thinks is the answer. These speech acts may be essential for the system to plan challenge questions to potential imposters.

In reference to the above, the plans may represented as complex structures of mental and emotion states of a user (e.g., belief, goal, intents, emotions) and actions connected via "achieves" and "enables" relations to those states. In an example, a system may have a logical representation of the expressions below.

System intends to ask User what date the User wants the system to make an appointment for the User at a CVS covid vaccination center Achieves: System has a persistent goal to know the date on which to make an appointment for the User at the CVS covid vaccination center Which enables: User has a persistent goal that the system make an appointment for the User at the CVS covid vaccination center In another embodiment, one or more elements of the system plan contains the attitude(s) or modal operator(s) needed to maintain different representations for different dialogue participants. This enables the system to have different dialogues with different users simultaneously, such as asking a third party for information before responding to the user (see sample dialogue, utterance 3 in Table 3). The system can also track and respond to multiple users who are discussing a topic together with the system.

Figure 9:
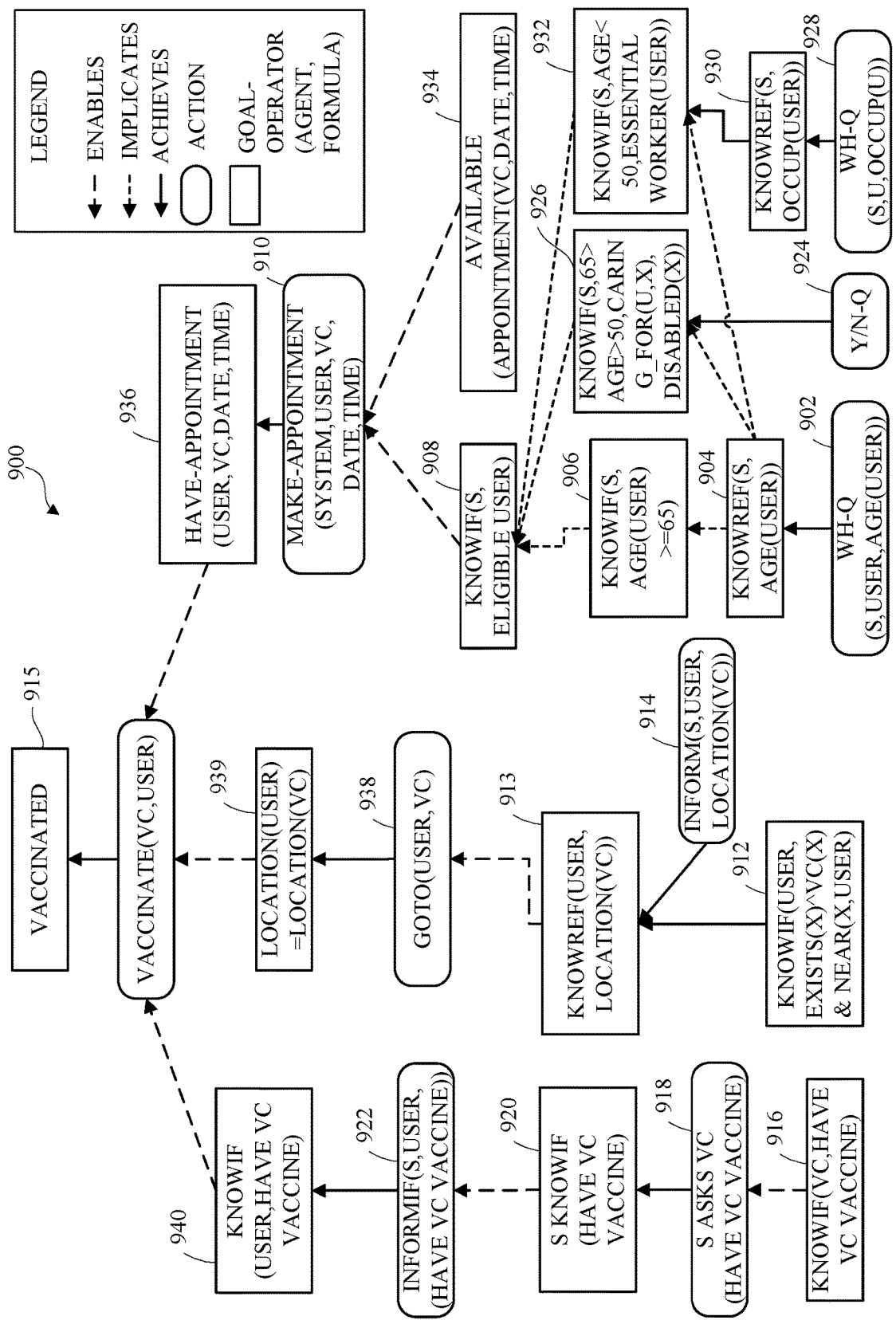
FIG. 9 is a flow diagram of an example plan in accordance with embodiments of this disclosure.

Properly representing the different mental attitudes/states enable the system to distinguish its goals/intentions with respect to the plan from the user(s). Each of the formulas below shows an Attitude as applied to a formula or performance of an action. An example plan generated by the system is shown in FIG. 9, which derives the sample dialogue shown in Table 3.

In reference to the above, the exemplary dialogue system presented can explain its utterances in terms of its and its interlocutor(s)'s beliefs, goals, and intentions. All actions that the system takes are explainable because every action the system performs (or is planned for another agent to perform) has been intended and is part of an overall plan. The action is performed in order to achieve its effect $E_1$, which may enable another action $A_2$ by making its precondition true. This may result in a chain of achieves/enables relations $A_1 \rightarrow E_1 \rightarrow A_2 \rightarrow E_2 \rightarrow \ldots A_n$. Accordingly, if the user asks why action $A_1$ was performed, an explanation could be: "In order to perform $A_2$" or, "in order to perform $A_n$". This works just as well for actions with other agents, for example:

"In order that you be able to perform $A_2$, . . . "
The same approach works for communicative actions and physical actions.
E.g., "Why did you say/ask that?"
Note that the intermediate goal states (i.e., $E_1$, $E_2$, $E_n$, etc.) can also be part of an explanation.
"Why did you ask X?" "Because I needed to know X in order to perform action A."
A similar process can be used for explaining conclusions:
"Why did you ask my occupation?" "Because knowing your occupation enables me to determine if you are an essential worker."

A method to explain a system action may begin from the system speech act (SA). The method may include following achieve/implicates links/relations in the plan until an enables link is found. The method may include following the enables link to an Action ACT. In an example, the method may result in determining an explanation that the system performed SA in order to achieve each proposition at the tail (i.e., arrow-head) end of the link, in order for the agent of ACT to be able to perform ACT. An example method is described in greater detail and shown in FIG. 9.

Figure 6:
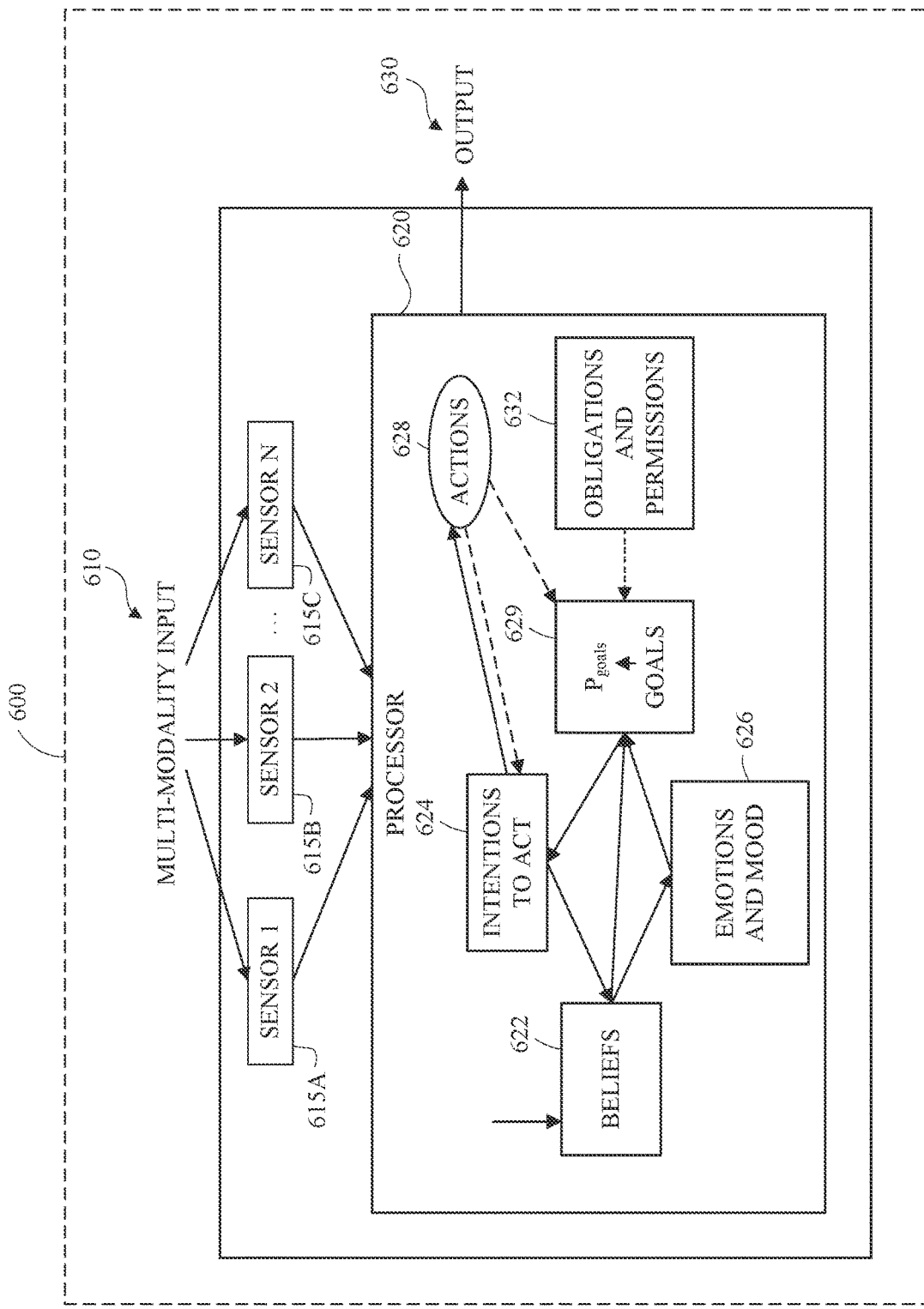
FIG. 6 is a block diagram of an example system configured to implement operational semantics in accordance with embodiments of this disclosure.

FIG. 6 is a block diagram of an example system 600 configured to implement operational semantics in accordance with embodiments of this disclosure. The system 600 implements a belief-goal-intention-emotion (E) architecture, where personality characteristics such as emotions & moods are incorporated in the conventional BGI (Belief, Desire, Intention) architecture. Conversational emotional agents are developed using the BGIE architecture. The main source of input to the system 600 is by observing the world via multimodality input 610 using one or more sensors, such as sensors 615A-615C, where the User's BGI' s are analyzed by the conversational emotional agents of processor 620. The conversational emotional agents may include a beliefs agent 622, an intentions agent 624, an emotions agent 626, an actions agent 628, a commitments agent 629, and an obligations and permissions agent 632. The commitment (e.g., a persistent goal) of the commitment agent 629 may be used as an output 630. The embodiments disclosed herein are based on BGIE logic that can be considered as a specification stating how the system should behave, how building the system obeys the principles and how to choose beliefs, intentions, emotions, and execute actions, while obeying commitments, and obligations and permissions. The Conversational emotional agents are characterized by both mental states (like beliefs, intents, goals, etc.) and emotional states (like emotions, mood, empathy, etc.). The dialogue model of User's BGIE is based on the theory of speech acts. Utterances and intents of a dialogue leads to an action, which is commonly represented as speech act. The multimodal discourse structure is composed of one or more linguistic, audio and video structures. Multimodal utterances form a hierarchy of discourse segments from at least one multimodal element, each of which has a corresponding belief, intention, emotion, etc. Various multimodal interaction of users works in a collaborative way through performing multimodal act, in order to execute actions that are resulting out of utterances, intents, emotions, etc. of a dialogue participant/user. Advanced speech recognition, natural language and computer vision techniques are used to perform the tasks of converting speech to text, converting text to logical form, inferencing facial emotions and body language, etc. The multimodal dialogue model is encoded into a set of plans and coordination is achieved by conversational emotional agents using these plans.

Beliefs, intentions, emotions, actions, commitments, obligations, and permissions are related artifacts of a dialogue. Beliefs include the past and current state of a dialogue related to a performed action by an agent. The beliefs agent 622 is configured to receive input from the one or more sensors 615A-615C and form an agent's knowledge about the environment (that is, observing the world) based on these beliefs. The agent may have an intention to perform an action in order to achieve the desired goal. The intentions agent 624 is configured to obtain elements of the plan to determine intentions. Intentions are related to the plan segment, where an actions' performance depends on the agent's emotion and mood. The actions agent 620 is configured to execute the actions as per the dialogue plan, which discharges intentions and goals. The intentions represent the agent's action-specific information while executing that action. The intentions may change as the action progresses, which in turn generate additional beliefs. The emotions agent 626 is configured to determine emotions based on the progress of a plan execution by the agent. The agent's emotion and mood may represent one of the agent's emotional states that directs the plan execution based on the agent's beliefs in order to achieve a goal. To achieve the desired goal, the intentions agent 624 is configured to use intentions to drive the identification of an action according to the commitment of an agent, whereas emotions drive the execution of a specific action based on the agent's belief. On the other hand, intention leads to action, and the agent is committed to achieving that action. Desire is the agent's goal to achieve by performing the action. Accordingly, the intention is identified based on the agent's desire which is defined in the form of plans and (pre- & post-)conditions. Thus, beliefs may comprise an agent belief whereas intentions may comprise the plans to achieve the desired goal. The obligations and permission agent 632 is configured to facilitate the definition of the plans (comprising a sequence of actions) for agents to have a meaningful dialogue. The goals are reflected in plans as per the agent's obligations and permissions. That is, the plan generation is driven by obligations as well as permissions it receives from the agent. In the embodiments disclosed herein, artifacts such as beliefs, intentions, emotions, actions, commitments, obligations and permissions are achieved via speech acts.

Figure 7:
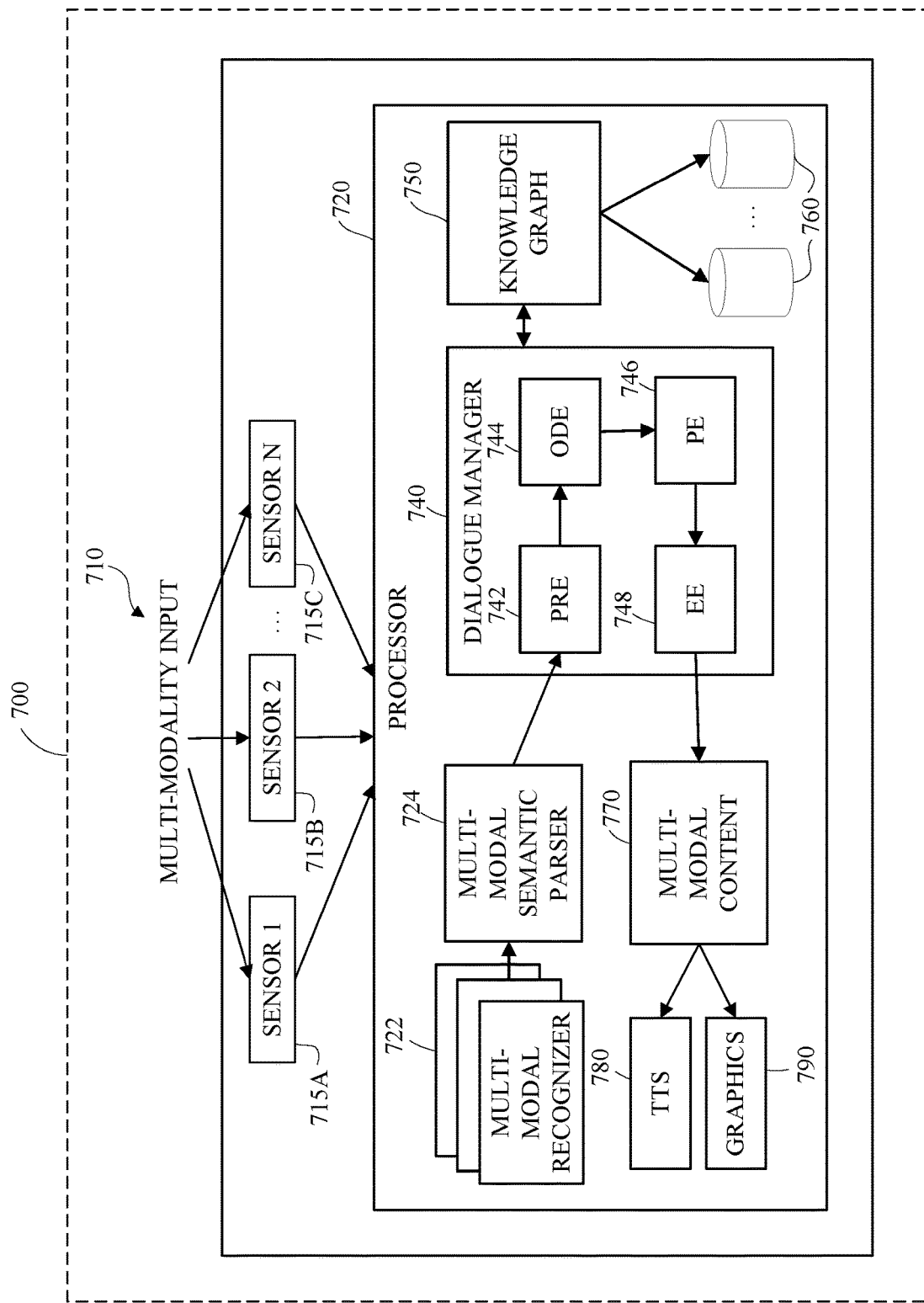
FIG. 7 is a block diagram of an example system for plan-based collaborative dialogue management in accordance with embodiments of this disclosure.

FIG. 7 is a block diagram of an example system 700 for plan-based collaborative dialogue management in accordance with embodiments of this disclosure. A multi-modality input 710 (e.g., the user dialog) is fed to a multimodal recognizer 722. The multimodal recognizer 722 may include one or more recognizers such as an automatic speech recognizer (ASR), a gesture recognizer, a facial recognizer, and other multimodal recognizers. The inputs from these recognizers may be obtained from one or more sensors, such as sensors 715A-715C and input to a multimodal semantic parser 724 for semantic parsing and fusion of multimodal elements, to discover beliefs, intents, emotions, and the like, of the user. For example, the multimodal semantic parser 724 may be configured to generate a logical expression of the input received from the multimodal recognizer 722 and input the logical expression to the dialogue manager 740. The dialogue manager 740 is a core component of the disclosed plan-based collaborative dialogue management. The dialogue manager 740 includes a plan recognition engine (PRE) 742, an obstacle detection engine (ODE) 744, a planning engine (PE) 746, and an execution engine (EE) 748. The dialogue manager 740 is configured to generate a plurality of plans, determine the user plans, detect the regions of those plans (i.e., both system generated and user plans) that form obstacles, identifies the alternative plans in the case of obstacles and execute one or more of those plans, as well as identifying and/or updating the context among the sequence of dialogues presented to the system 700. For example, the PRE 742 may be configured to perform steps 310-340 shown in FIG. 3, and the ED may perform steps 350-370 shown in FIG. 3. The ODE 744 may detect obstacles, for example, as shown in FIG. 4. The dialogue manager 740 interacts with knowledge sources and the obtained knowledge is modeled in a local database, a remote database, or in the form of a local or remote knowledge graph 750. The knowledge graph 750 comprises multimodal dialogue state information such as (mutual) beliefs, goals, preferences, (individual or joint) intentions, obligations, expectations, norms, rules, domain knowledge, personal knowledge, actions, data, or the like. The dialogue manager 740 also interacts with external knowledge sources and applications 760 such as Yelp, OpenStreetMaps, or the like, to determine/discover facts to be used or conveyed. Based on the actions of plan execution, the dialogue manager 740 generates the response to multimodal inputs of the user by producing the multimodal content 770 that is rendered by one or more presentation tools like Text-To-Speech (TTS) 780, a graphic or display 790, robot, or the like. The dialogue manager also controls the overall dialogue flow.

In practice, exemplary systems described herein such as systems 200, 600 and, 700 can include additional system components, additional relationships between system components, and the like. The relationships shown between modules within exemplary systems described herein such as system 600 indicate general flows of information in the respective system; other relationships are not shown for the sake of simplicity. Depending on the implementation and the type of processing desired, modules of the system can be added, omitted, split into multiple modules, combined with other modules, and/or replaced with like modules. Generally, the technologies described herein are generic to different operating systems or hardware and can be applied in any variety of environments to take advantage of the described features.

Figure 8:
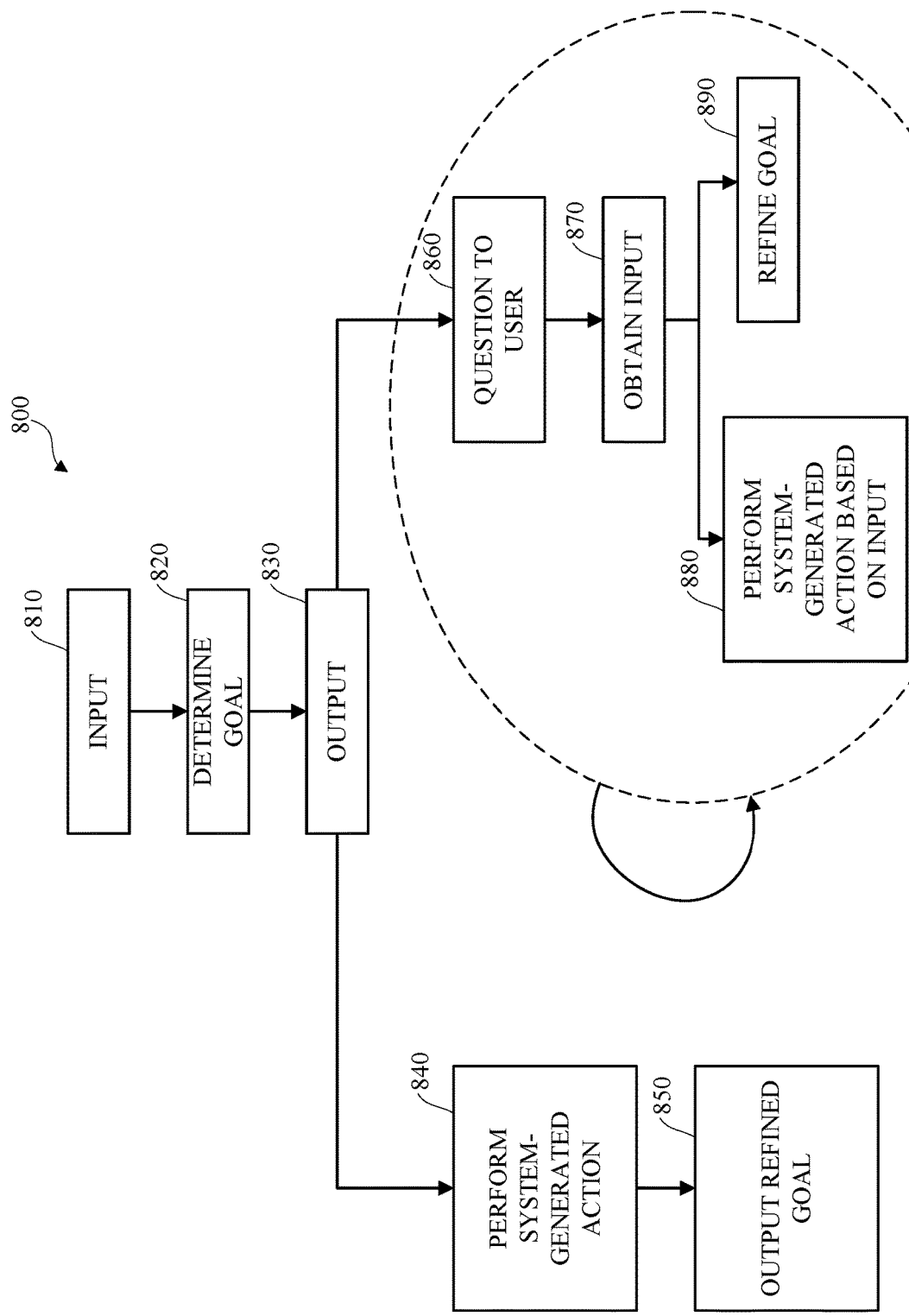
FIG. 8 is a flow diagram of an example method for goal generation in accordance with embodiments of this disclosure.

FIG. 8 is a flow diagram of an example method 800 for goal generation in accordance with embodiments of this disclosure. The method 800 includes receiving a multimodal input 810 from one or more sensors. The multimodal input may include a voice input, a gesture input, an image or video input, such as from a camera, a location input, such as from a GPS sensor, a motion input, such as from an accelerometer, or any combination thereof. A voice input may include an utterance spoken by a user and may be in the form of a question. The method 800 includes determining 820 a goal of the user. The goal may be determined based on the multimodal input.

The method 800 includes generating 830 an output. The output may be generated based on the determined goal. Generating 830 the output may include performing 840 a system-generated action to output 850 a refined goal. The refined goal may be referred to as a subgoal. Generating 830 the output may include generating 860 a question to the user to obtain 870 an input from the user. The method 800 may include performing 880 a system-generated action based on the input. Alternatively, the method 800 may include refining 890 the goal based on the input. Operations 860-890 may be repeated until the goal is accomplished. Accordingly, the method 800 is based on generating one or more subgoals based on the determined goal of the user. For each subgoal, the method 800 includes determining whether the system has enough information to achieve the subgoal. If the system does not have enough information to achieve the subgoal, the method 800 includes querying the user or a third party to obtain the information to achieve the subgoal.

FIG. 9 is a flow diagram of an example plan generation 900. In the example plan generation 900, when the system generates a plan, a goal-operator includes that the system has a pgoal for the actions and formulas, and that the system intends to perform its own actions. When the system determines a user plan, a goal-operator includes that the system believes that the user has a pgoal for the actions and formulas, and the system believes that the user intends to perform the actions. In an example, a system may ask "how old are you?," which may be a realization of the yes-no question speech act WH-Q. "How old are you?" is a WH-Q. The explanation for the question is that the system asked the question in order to know whether or not (i.e., KNOWIF) the user is eligible for a vaccine, which enables the system to make an appointment for the User. As shown in FIG. 9, the WH-Q 902 achieves the following. The system knows 904 the User age, which implicates the system knowing 906 whether the User age is >=65 years old, which partially implicates that the system knows 908 whether the User is eligible to receive the vaccine, which enables the system to make 910 an appointment for the user.

The linguistic explanation is thus: "I asked the question because I needed to know whether you are eligible for a covid vaccine in order to make an appointment for you at a vaccine center." The linguistic explanation does not include the implicated goals, i.e., the user age and whether the user is 65 or older, which are typically not obvious to systems.

As shown in FIG. 9, the dialogue system need not wait to be asked for an explanation. For example, the dialogue system can proactively offer a rationale for its utterances based on the plan. The presented rationale-enabled planner, given the action make-appointment 910, may generate a motivating utterance: "In order to make an appointment for you at a vaccination center, I need to know whether you are eligible for a vaccine. So, how old are you?" In this example, the dialogue system is configured to reason about persistent goals. For the purposes of this disclosure, persistent goals may be paraphrased as "wants." When verbalizing persistent goals that are preconditions, this disclosed dialogue system is configured to paraphrase the preconditioned persistent goals as "needs."

The plan generation 900 is a top-down planning process, which verbalizes the enables relation between the action, for example make-appointment 910, and knowing-whether the precondition is true. The system prefixes speech acts that achieve or implicate subgoals of the prior Goal (here, via know-whether and knowref) using "so," "therefore," "thus," "consequently," or other words with similar meanings if the speech act describing the higher-level goal or action is uttered first. If the speech act describing the subgoal is uttered first, the system prefixes the speech act communicating the higher level goal or action with "because" or "in order to." Other "rationale indicators" that can be generated from a plan may include, for example, when two speech actions are to be performed that are on different branches of a plan (i.e., they are not in a sub-goal or implicates a relationship to one another), if the first action satisfies a goal, the system can utter "OK." The second speech action can be preceded by "Now," to indicate it is in service of a new plan goal. For example, after utterance 12 in Table 3, the system could proactively say: "OK, now, would you like me to make an appointment for you?"

The dialogue system is configured to generate an explanation for an utterance, such as a response to "why did you say/ask that" based on the system plan, which includes physical, digital, and communicative actions, as well as the formulas they achieve and that enable them to be performed. The dialogue system may proactively generate a rationale for the system communicative actions, for example, generating "so" or "because" via the plan before being asked for an explanation.

In the example shown in FIG. 9, the user may ask the dialogue system "Are there any covid vaccination centers nearby?" In response to receiving the utterance from the user, the system infers 912 that the user wants to know if there exists a covid vaccination center nearby. Since the dialogue system knows 913 the location of the user, the dialogue system may then inform 914 the user by answering the question based on sensor data that indicates the user location. For example, the dialogue system may respond with the utterance: "Yes, CVS is a covid vaccination center located at 130 Main Street, 6 miles away from you."

The dialogue system may infer that the user wants to know where the vaccination center is because the user wants to be vaccinated 915. An applicability condition for being vaccinated is the availability of the vaccine. The dialogue system does not know 916 if the CVS has vaccine available. The dialogue system may plan and execute a yes/no question to the CVS regarding vaccine availability. For example, the dialogue system may transmit 918 a message to CVS to determine whether the CVS has vaccine available. The message may include an utterance: "Do you have covid vaccine available?" The CVS may respond "Yes" to the dialogue system, and the dialogue system determines 920 that the vaccine center has vaccine available. The dialogue system may then inform 922 the user that the vaccine is available, for example, by utterance "CVS has covid vaccine."

The dialogue system believes that eligibility is a precondition of being vaccinated. The dialogue system is configured to say "now" when it begins to work on a new goal. For example, the dialogue system may follow up with the utterance: "Now, I need to know whether you are eligible for a vaccination." The dialogue system may generate WH-Q 902, for example, which includes utterance: "So, how old are you?" to determine 804 the age of the user. The dialogue system is configured to derive the logical form of the question from the underlying logic of eligibility. In this example, the underlying logic of eligibility may include generating a yes/no question 924 such as "Are you caring for someone who is disabled?" to determine 926 whether the user is caring for someone that is disabled, and generating a WH-Q 928 to determine 930 the occupation of the user and determine 932 whether the user is an essential worker.

Based on the user responses, the dialogue system is configured to determine 908 whether the user is eligible for the vaccine. The dialogue system may confirm the prior stated goal, for example with utterance: "OK, you are eligible to receive a covid vaccine." The dialogue system is configured to say "OK" to convey that it has finished working on a prior goal or subgoal.

At this point, the dialogue system has an action that it can perform, but it needs to know whether the user wants the dialogue system to perform that action. The dialogue system may ask: "Now, would you like me to make an appointment at a covid vaccination center?" If the user answers "yes," the dialogue system sets a new goal 934 to obtain available appointment times to make 910 the appointment. The goal of having 936 an appointment is achieved when the appointment is made.

The dialogue system is configured to trace through the chain of equivalences to combine all the parts of this plan. For example, the dialogue system is configured to infer 938 that the vaccination center at which the user wants the appointment is the vaccination center where the user wants to be vaccinated, which is the vaccination center where the user wants to go, which is the vaccination center 939 that is 6 miles away and has covid vaccine available 940.

Figure 10:
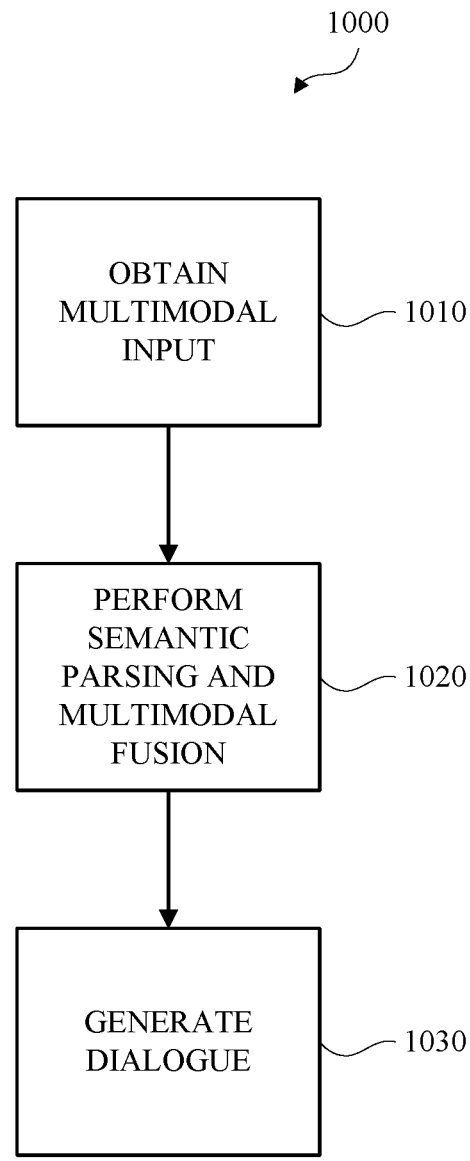
FIG. 10 is a flow diagram of an example method for generating a dialogue in accordance with embodiments of this disclosure.

FIG. 10 is a flow diagram of an example method 1000 for generating a dialogue in accordance with embodiments of this disclosure. The method 1000 may be performed by a system, such as system 700 shown in FIG. 7. The method 1000 includes obtaining 1010 multimodal input. The multimodal input may be obtained from one or more sensors, such as sensors 715-A-715C shown in FIG. 7. The method 1000 includes performing 1020 semantic parsing and multimodal fusion. Performing semantic parsing and multimodal fusion may include, for example, generating a logical expression based on the one or more multimodal inputs. The method 1000 includes generating 1030 a dialogue. The dialogue may be generated based on interactions with knowledge sources, and the obtained knowledge may be modeled in a local database, a remote database, or in the form of a local or remote knowledge graph. The knowledge graph may include multimodal dialogue state information such as (mutual) beliefs, goals, preferences, (individual or joint) intentions, obligations, expectations, norms, rules, domain knowledge, personal knowledge, actions, data, or the like. The dialogue may also be generated based on interactions with external knowledge sources and applications such as Yelp, OpenStreetMaps, or the like, to determine/discover facts to be used or conveyed. Based on the actions of plan execution, the dialogue may generate the response to multimodal inputs of the user by producing multimodal content that is rendered by one or more presentation tools such as TTS, graphic or display, robot, or the like.

In the examples described herein, a context may become incrementally populated by the effects of the participant speech acts. This enables the dialogue system to combine the meanings of a user noun-phrase fragmentary response (e.g., "7 pm") or whole propositions (e.g., the meaning of "I want to eat at 7 pm") into a formula in the context.

One or more methods described herein may include combining the meaning of an answer with the prior context that contains one or more effects of the prior speech acts via unification of the value or constraint provided or via replacement of that value or constraint in the prior contextual representation. It enables users to provide constraints on requested values rather than just atomic values. The constraints are unified into or replace parts of the constraint formulae that are part of actions, such as domain or speech acts.

One or more methods described herein may represent the default beliefs of a person, for example that people know their age, their occupation, etc. They also generally know what they want. But, in a given context, when asked, "what time do you want to eat?", the person could respond "before 7 pm". The system retracts that the user knows what s/he wants in this case, but not in the general case. Likewise, the user could say "I don't know", or "whatever time Mary wants", or some other utterance that indicates the user does not know what time s/he wants to eat. These responses then enable the system to form an alternative plan, for example to ask Mary what time she wants to eat.

One or more methods described herein may include using multimodal and sentiment processing to decide if the user is being insincere (e.g., deceptive), ironic, sarcastic, or joking. The normal effects of speech acts are not taken to hold if any of the above conditions is detected. Thus, the system protects its "core" mental states, its beliefs about the world and its intentions to act, from necessarily believing the speaker or doing what the speaker wants it to do.

Because the system is able to represent and reason about a speaker's (a person or computer agent)'s mental states such as belief, desire, goal, intention, commitment (persistent goal), etc., it needs to represent that the speaker can want/have as goal/intend to cause the system to have a false belief about that speaker's mental state. This is called herein "insincerity." Insincerity consists of knowingly and intentionally causing the system to have a false belief that proposition P is true about the world via the speaker's informing that proposition P is true, or a false belief that the speaker believes the speaker wants/has as goal/intends to do some action A (as in an insincere promise to do an A), or a false belief that the speaker wants/has as goal/intends for the system to do some action A. Current research has identified that systems can verbally or multimodally identify whether a person is lying or insincere. The disclosed system uses a predicate insincere(Speaker, Listener, P) in the antecedent condition of a rule that says that the effect of the observed insincere speech act is that the speaker believes the act's precondition is false and wants/has as goal/intends for the listener to believe P is true. Conversely, the system can use sincere(Speaker, Listener, P), which implies that if the speaker wants the listener to believe P, the speaker wants the listener both to believe P and for P to be true, i.e., that the Listener knows P. Importantly, because of the identified insincerity, the system has a reason to choose NOT to believe the speaker that the conveyed proposition about the world or the speaker's mental state is true.

Many people change their words, intonation and/or facial expressions when they are saying something ironically, sarcastically, or jokingly. Present research enables systems to determine via processing text-only, audio-only or multimodal signals that a person is insincere/lying, ironic, sarcastic, or joking. By incorporating a nonserious predicate in the observation condition, the system can avoid believing fact P when it believes the speaker wants/has as goal/intends that the system form a belief that the speaker believes ~P. Thus, a nonserious utterance will imply that a speaker who performs an action the effect of which is that the system believes P is false, and believes the speaker believes the system believes P to be false. The condition that gates the effects in Rule 1 below derived from observing a speaker's performance of a speech act is that sincere(Speaker, Listener, P) & serious(Speaker, Listener, Act), then the hearer will infer that the speaker wanted it to believe the precondition held, and that the speaker wants the effect to hold. In one embodiment of the system, it can identify people whom it believes are lying, and decide not to believe them and not to cooperate in performing actions for them. (Below, the symbol '|=' means the formula is an axiom, and '⊃' indicates logical negation.)

|=sincere(A,B,P) ⊃
    pgoal (A, bel(B, P)) ⊃ pgoal(A, bel(B, P) & P)
|=insincere(A,B,P) ⊃
    pgoal(A, bel(B, P) & ~P)

|=nonserious(A,B,Acl) ⊃
   pgoal(A, done(obs(B, Act))) &
   effect(Act,Q) ⊃
   pgoal(A, bel(A,~Q) & bel(B bel(A,~Q)))
Rule 1: Precondition of Sincere and serious act:
   done (obs(B, Act))
      & precondition(Act,P)
      & sinccre(A, B, P)
      & nonserious(A,B,P)
   →
   bel(B, bel(A, P))
Rule 2: Effects of sincere and serious Act
   done (obs(B, Act))
      & effects(Act, Q)
      & sincere(A, B, Q)
      & nonserious(A,B,Q)
   →
   bel(B, pgoal(A, Q))

Rules 1 and 2 above block the normal effects of observing speech acts when the speaker is believed to be insincere or nonserious. The conclusions to be drawn from observing insincere or nonserious actions follow from the definitions of sincere and ironic above, and are handled by Rules 3 and 4 below:

Rule 3: Beliefs of precondition of Ironic Act
   done(obs(B, Act))
      & precondition (Act,P)
      & nonserious(A, B, Act)→
   bel(A, ~P) & bel(B, bel(A,~P))
Rule 4: Effects of Ironic Act
   done(obs(B, Act))
      & effect(Act, Q)
      & nonserious(A, B, Act)→
   pgoal(A, bel(A, ~Q) & bel(B, bel(A,~Q))

While the embodiments described herein may be susceptible to various modifications and alternative forms, specific embodiments thereof are shown by way of example in the drawings and will be described in detail below. It should be understood, however that these examples not intended to limit the embodiments to the particular forms disclosed, but on the contrary, the disclosed embodiments cover all modifications, equivalents, and alternatives falling within the spirit and the scope of the disclosure as defined by the appended claims.

The method steps have been represented, wherever appropriate, by conventional symbols in the drawings, showing those specific details that are pertinent to understanding the embodiments so as not to obscure the disclosure with details that will be readily apparent to those of ordinary skill in the art having benefit of the description herein.

The terms "comprises," "comprising," or any other variations thereof, are intended to cover a non-exclusive inclusion, such that a process, method that comprises a list of steps does not include only those steps but may include other steps not expressly listed or inherent to such process or method. Similarly, one or more elements in a system or apparatus proceeded by "comprises . . . a" does not, without more constraints, preclude the existence of other elements or additional elements in the system or apparatus.

The features of the present embodiments are set forth with particularity in the appended claims. Each embodiment itself, together with further features and attended advantages, will become apparent from consideration of the following detailed description, taken in conjunction with the accompanying drawings.

The disclosed embodiments describe retrieving and organizing information from a set of applications, data sources, or both, by performing various steps as is described in details in forthcoming sections. For the sake explanation and understanding, reference is drawn towards a typical search query where the process heavily relies on multi-modality technology for converging speech, text, images, touch, language, and the like. Success of such a multi-modality platform mainly depends on how good and relevant the obtained results are.

Having described and illustrated the principles with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein.

Elements of the described embodiments shown in software may be implemented in hardware and vice versa. As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine-readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory. Modules can be defined by executable code stored on non-transient media.

The following description is presented to enable a person of ordinary skill in the art to make and use the embodiments and is provided in the context of the requirement for a obtaining a patent. The present description is the best presently-contemplated method for carrying out the present embodiments. Various modifications to the embodiments will be readily apparent to those skilled in the art and the generic principles of the present embodiments may be applied to other embodiments, and some features of the present embodiments may be used without the corresponding use of other features. Accordingly, the present embodiments are not intended to be limited to the embodiments shown but are to be accorded the widest scope consistent with the principles and features described herein.

What is claimed is:

1. A multimodal conversational dialogue method comprising:
   obtaining, by a system comprising one or more computing devices, one or more multimodal inputs from a user via sensors configured to obtain one or more multimodal inputs including an utterance, the utterance containing at least one of text, speech, audio, visual, body language and postures, gestures, facial expressions, eye gaze, and lip reading, wherein the sensors include at least a camera, a motion sensor, and a microphone, and wherein a portion of a multimodal input includes the utterance;

performing, by the system, semantic parsing and multimodal fusion of the one or more multimodal inputs to determine a goal of the user, wherein the semantic parsing and multimodal fusion includes generating, by the system, a logical expression based on the one or more multimodal inputs, and wherein the logical expression is at least one of a first-order logic formula or logical modality operators applied to the logical expression;

performing, by the system, an inference over the logical expression by at least recursively decomposing the logical expression into constituent parts and utilizing meta-logic interpreters to interpret the constituent parts, wherein the meta-logic interpreters include at least a proof meta-logic interpreter and an assertion meta-logic interpreter, wherein the proof meta-logic interpreter is configured to interpret that a proof of a first side of the constituent parts is contingent upon establishing the proof of a second side of the constituent parts, and wherein the assertion meta-logic interpreter is configured to interpret that an assertion of the first side of the constituent parts is contingent upon establishing an assertion of the second side of the constituent parts; and generating, by the system, a dialogue with the user based on a database that includes multimodal dialogue state information, wherein the multimodal dialogue state information includes goals and at least one of beliefs, preferences, intentions, obligations, expectations, norms, rules, domain knowledge, personal knowledge, actions, and data, and wherein the dialogue includes one or more system-generated utterances;

outputting, by the system, the one or more system-generated utterances; and determining, by the system, an emotional state of the user based on the dialogue.

2. The method of claim 1, wherein the dialogue is a cooperative plan-based dialogue.

3. The method of claim 1, wherein the one or more system-generated utterances are generated in real-time.

4. The method of claim 1 further comprising:
determining, by the system, whether the goal is achievable based on stored information; and
on a condition that the goal is not achievable based on stored information, generating and outputting, by the system, a system-generated utterance to obtain additional input from the user.

5. The method of claim 4, wherein the additional input from the user is used by the system to determine a subgoal.

6. The method of claim 1 further comprising:
determining, by the system, a cooperative plan based on one or more user actions, wherein the one or more user actions includes at least one of a spoken dialogue utterance, a typed dialogue utterance, a graphical user interface action, and a gesture.

7. The method of claim 6, wherein the inference includes a user plan based on the one or more user actions.

8. The method of claim 7 further comprising:
adopting, by the system, the goal of the user into a goal of the system.

9. The method of claim 1, wherein the one or more system-generated utterances includes a speech utterance.

10. The method of claim 1, wherein the one or more system-generated utterances includes a text utterance.

11. A multimodal conversational dialogue system comprising:
one or more sensors configured to obtain, by a system comprising one or more computing devices, one or more multimodal inputs from a user, wherein a portion of a multimodal input includes an utterance, the utterance including at least one of text, speech, audio, visual, body language and postures, gestures, facial expressions, eye gaze, and lip reading, wherein the sensors include at least a camera, a motion sensor, and a microphone;
a multimodal semantic parser configured to perform, by the system, semantic parsing and multimodal fusion of the one or more multimodal inputs to determine a goal of the user, wherein
the semantic parsing and multimodal fusion includes generating, by the system, a logical expression based on the one or more multimodal inputs, and utilizing a meta-logic interpreter to perform an inference over the logical expression, and
the logical expression is at least one of a first-order logic formula or logical modality operators applied to the logical expression;
a dialogue manager configured to:
generate system-generated plans based on actions in a database that include multimodal dialogue state information;
determine user plans based on the actions in the database;
identify a portion that forms obstacles in the system-generated plans and the user plans, respectively;
determine a plan based on the portion that forms obstacles; and
generate, by the system, a dialogue with the user based on the plan,
wherein the dialogue includes one or more system-generated utterances; and
output, by the system, the one or more system-generated utterances.

12. The system of claim 11, wherein the dialogue is a cooperative plan-based dialogue.

13. The system of claim 11, wherein the one or more system-generated utterances are generated in real-time.

14. The system of claim 11, wherein the dialogue manager is further configured to:
determine, by the system, whether the goal is achievable based on stored information; and
on a condition that the goal is not achievable based on stored information, generate and outputting, by the system, a system-generated utterance to obtain additional input from the user.

15. The system of claim 14, wherein the dialogue manager is configured to use the additional input from the user to determine, by the system, a subgoal.

16. The system of claim 11, wherein the dialogue manager is further configured to:
determine, by the system, a cooperative plan based on one or more user actions, wherein the one or more user actions includes at least one of a spoken dialogue utterance, a typed dialogue utterance, a graphical user interface action, and a gesture.

17. The system of claim 16, wherein the dialogue manager is further configured to:
- infer, by the system, a user plan based on the one or more user actions; and
- adopt the goal of the user into a goal of the system.

* * * * *